US012811201B2

(12) United States Patent
Nishida et al.

(10) Patent No.: US 12,811,201 B2
(45) Date of Patent: Nov. 24, 2026

(54) BATTERY

(71) Applicant: Prime Planet Energy & Solutions, Inc., Tokyo (JP)

(72) Inventors: Akira Nishida, Himeji (JP); Taisuke Iseda, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 615 days.

(21) Appl. No.: 18/359,873

(22) Filed: Jul. 27, 2023

(65) Prior Publication Data

US 2024/0039052 A1 Feb. 1, 2024

(30) Foreign Application Priority Data

Jul. 28, 2022 (JP) ................................ 2022-120873

(51) Int. Cl.

| | |
|---|---|
| ***H01M 10/0587*** | (2010.01) |
| ***H01M 50/103*** | (2021.01) |
| ***H01M 50/15*** | (2021.01) |
| ***H01M 50/414*** | (2021.01) |
| ***H01M 50/434*** | (2021.01) |
| ***H01M 50/446*** | (2021.01) |
| ***H01M 50/449*** | (2021.01) |
| ***H01M 50/46*** | (2021.01) |
| ***H01M 50/463*** | (2021.01) |
| ***H01M 50/489*** | (2021.01) |
| ***H01M 50/531*** | (2021.01) |
| ***H01M 50/627*** | (2021.01) |

(52) U.S. Cl.

CPC ..... *H01M 10/0587* (2013.01); *H01M 50/103* (2021.01); *H01M 50/15* (2021.01); *H01M 50/414* (2021.01); *H01M 50/434* (2021.01); *H01M 50/446* (2021.01); *H01M 50/449* (2021.01); *H01M 50/461* (2021.01); *H01M 50/463* (2021.01); *H01M 50/489* (2021.01); *H01M 50/531* (2021.01); *H01M 50/627* (2021.01)

(58) Field of Classification Search

CPC ........... H01M 10/0587; H01M 50/489; H01M 50/531; H01M 50/414; H01M 50/461; H01M 50/103; H01M 50/463; H01M 50/446; H01M 50/627; H01M 50/449; H01M 50/434; H01M 50/15

USPC .......................................................... 429/144

See application file for complete search history.

(56) References Cited

U.S. PATENT DOCUMENTS

| | | | | |
|---|---|---|---|---|
| 2018/0034028 | A1* | 2/2018 | Jung | H01M 50/461 |
| 2022/0216522 | A1 | 7/2022 | Ono | |
| 2022/0384854 | A1* | 12/2022 | Kawamura | H01M 50/451 |

(Continued)

FOREIGN PATENT DOCUMENTS

| | | | |
|---|---|---|---|
| CN | 114725526 | A | 7/2022 |
| JP | 5328034 | B2 | 10/2013 |

(Continued)

*Primary Examiner* — James M Erwin

(74) *Attorney, Agent, or Firm* — HAUPTMAN HAM, LLP

(57) ABSTRACT

A battery disclosed herein includes a wound electrode body in which a positive electrode and a negative electrode are wound through a separator. The separator includes the adhesive layer on at least one surface, and on the one surface, a non-formation region where the adhesive layer is not formed is provided in at least one end part in a winding axis direction.

10 Claims, 8 Drawing Sheets

(56) References Cited

U.S. PATENT DOCUMENTS

| | | | | |
|---|---|---|---|---|
| 2023/0083594 | A1* | 3/2023 | Yu | H01M 10/0587 429/94 |
| 2023/0352773 | A1 | 11/2023 | Oh et al. | |
| 2023/0369630 | A1 | 11/2023 | Kwon et al. | |

FOREIGN PATENT DOCUMENTS

| | | | |
|---|---|---|---|
| JP | 2014-154484 | A | 8/2014 |
| JP | 2016-152170 | A | 8/2016 |
| JP | 2018-120811 | A | 8/2018 |
| JP | 2021-118139 | A | 8/2021 |
| WO | 2021/194282 | A1 | 9/2021 |
| WO | 2022/036721 | A1 | 2/2022 |
| WO | 2022/039531 | A1 | 2/2022 |

* cited by examiner

BATTERY

CROSS REFERENCE TO RELATED APPLICATION

This application claims the benefit of priority to Japanese Patent Application No. 2022-120873 filed on Jul. 28, 2022. The entire contents of this application are hereby incorporated herein by reference.

BACKGROUND OF THE DISCLOSURE

1. Field

The present disclosure relates to a battery.

2. Background

One of the conventionally known batteries includes a wound electrode body in which a positive electrode with a band shape including a positive electrode active material layer and a negative electrode with a band shape including a negative electrode active material layer are wound through a separator with a band shape. For example, Japanese Patent No. 5328034 discloses an electrode body in which an adhesive layer is formed on an entire surface of a separator and then an electrode body group including a positive electrode, the separator, and a negative electrode is pressed with heat, so that at least one of the positive electrode and the negative electrode is unified with the separator, and also discloses a battery including the electrode body.

SUMMARY

The present inventors' examination indicates, however, there is room for improvement about the aforementioned technique. That is to say, in order for the adhesive layer to achieve an adhering function, it is necessary to apply a predetermined load at a place where the adhesive layer is formed. However, when the electrode body group is pressed with heat, the heat and load concentrate on a thick part where an active material layer is provided and the heat and load are hardly applied on a region that does not face the active material layer (specifically at an end part in a winding axis direction). Therefore, it has been understood that the provision of the adhesive layer on the entire surface of the separator as disclosed in Japanese Patent No. 5328034 cannot achieve the adhering function at the end part in the winding axis direction and the expensive adhesive is wasted.

The present disclosure has been made in view of the above circumstances, and a main object is to provide a battery with a reduced manufacturing cost by reducing the usage of the adhesive.

A battery according to the present disclosure includes a wound electrode body in which a positive electrode with a band shape including a positive electrode active material layer and a negative electrode with a band shape including a negative electrode active material layer are wound through one or a plurality of separators with a band shape. At least one of the separators includes an adhesive layer on at least one surface. On the one surface, a non-formation region where the adhesive layer is not formed is provided in at least one end part in a winding axis direction.

By providing the non-formation region in the end part in the winding axis direction, the adhesive can be used efficiently. Accordingly, the unnecessary usage of the adhesive can be reduced and the cost for manufacturing the battery can be reduced. Additionally, by having the adhesive layer, the separator can be unified with at least one of the positive electrode and the negative electrode. Thus, for example, the variation of the inter-electrode distance between the positive electrode and the negative electrode can be suppressed to improve the battery characteristic. Furthermore, the separator will not be displaced easily under the impact at the vibration or drop, for example, during the use of the battery, and thus, the vibration resistance can be improved.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Embodiments of the art disclosed herein will be described below with reference to the drawings. Incidentally, matters other than matters particularly mentioned in the present specification, and necessary for the implementation of the art disclosed herein (for example, the general configuration and manufacturing process of a battery that do not characterize the present disclosure) can be grasped as design matters of those skilled in the art based on the conventional art in the relevant field. The art disclosed herein can be implemented on the basis of the disclosure of the present specification and common technical knowledge in the relevant field. In the present specification, the notation "A to B" for a range signifies "a value more than or equal to A and less than or equal to B", and is meant to encompass also the meaning of being "more than A" and "less than B".

Note that in the present specification, "battery" is a term that refers to a general power storage device capable of extracting electric energy, and refers to a concept that includes a primary battery and a secondary battery. In the present specification, "secondary battery" refers to a general power storage device capable of being repeatedly charged and discharged by transfer of charge carriers between a positive electrode and a negative electrode through an electrolyte. The electrolyte may be any one of a liquid electrolyte (electrolyte solution), a gel electrolyte, and a solid electrolyte. The secondary battery includes so-called power storage batteries (chemical batteries) such as lithium ion secondary batteries and nickel-hydrogen batteries, and moreover includes capacitors (physical batteries) such as electrical double-layer capacitors, for example. A target in embodiments to be described below is a lithium ion secondary battery.

First Embodiment

Figure 1:
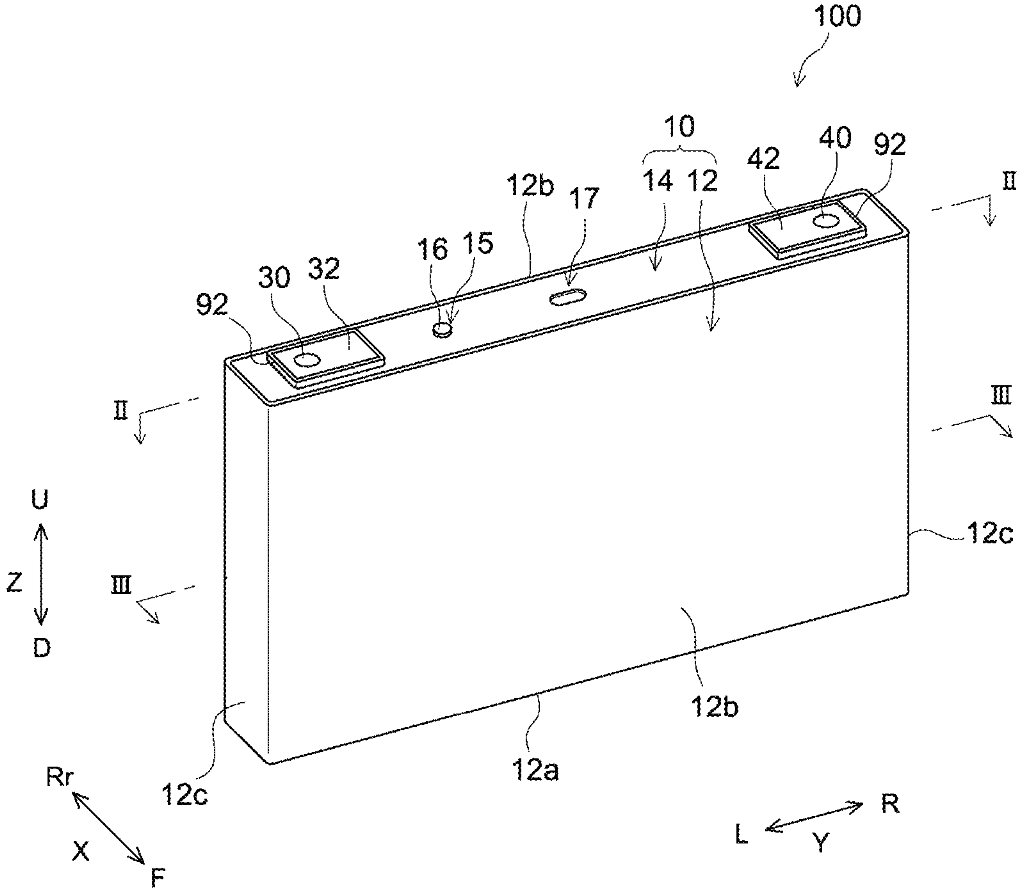
FIG. 1 is a perspective view schematically illustrating a battery according to a first embodiment.
Figure 2:
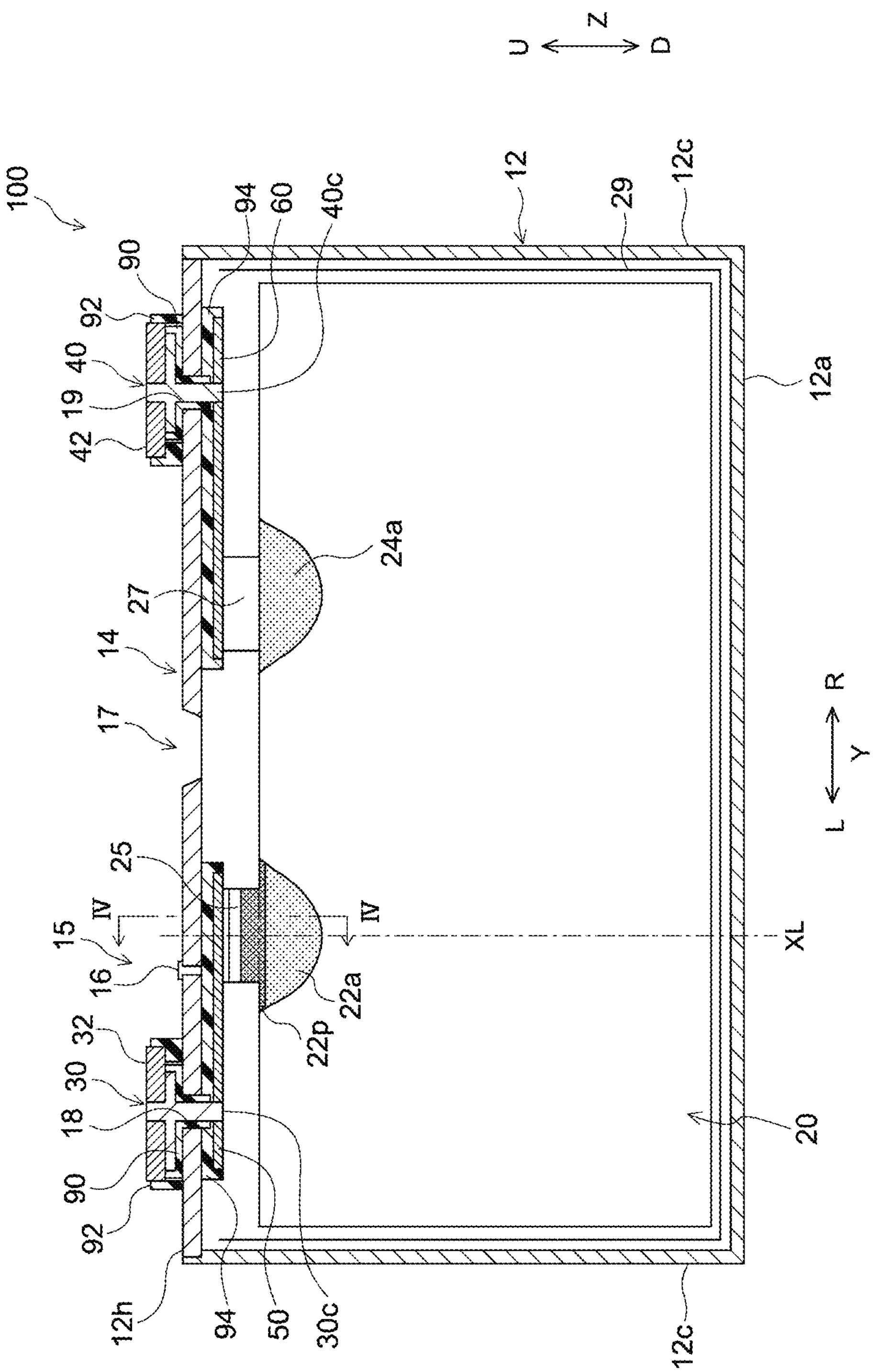
FIG. 2 is a schematic longitudinal cross-sectional view taken along line II-II in FIG. 1.
Figure 3:
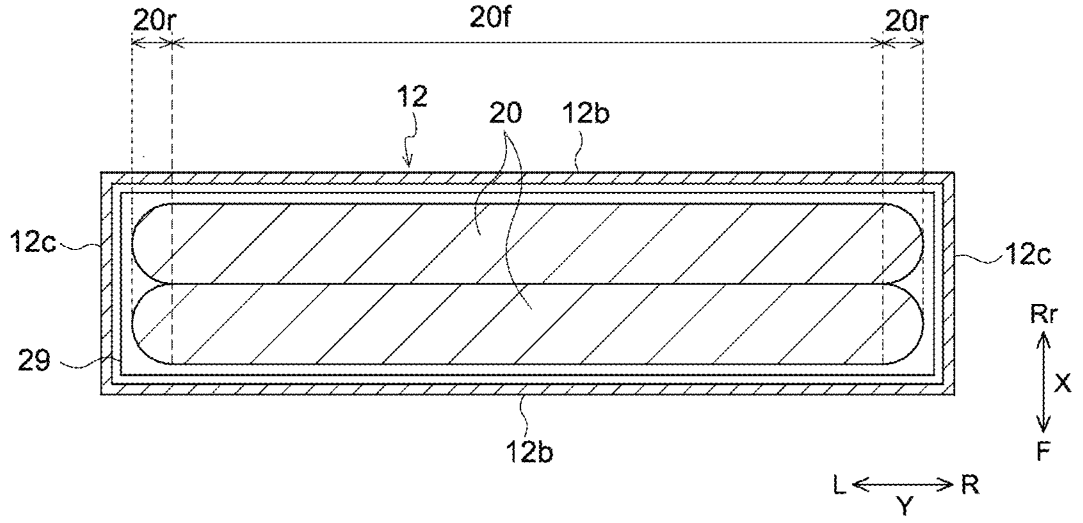
FIG. 3 is a schematic lateral cross-sectional view taken along line in FIG. 1.
Figure 4:
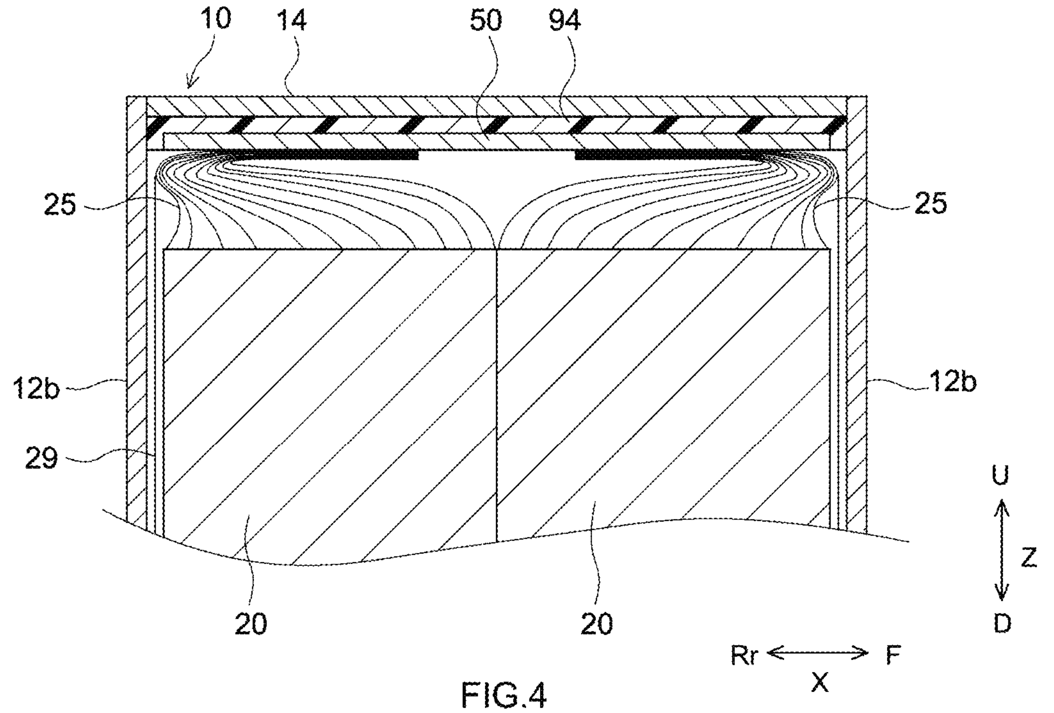
FIG. 4 is a schematic longitudinal cross-sectional view taken along line IV-IV in FIG. 2.

FIG. 1 is a perspective view schematically illustrating a battery 100 according to a first embodiment. The battery 100 is preferably a secondary battery, and more preferably a nonaqueous electrolyte secondary battery such as a lithium ion secondary battery. FIG. 2 is a schematic longitudinal cross-sectional view taken along line II-II in FIG. 1. FIG. 3 is a schematic lateral cross-sectional view taken along line in FIG. 1. FIG. 4 is a schematic longitudinal cross-sectional view taken along line IV-IV in FIG. 2. In the following description, reference signs L, R, F, Rr, U, and D in the drawings respectively denote left, right, front, rear, up, and down. In addition, a reference sign X in the drawings denotes a short side direction of the battery 100, a reference sign Y denotes a long side direction of the battery 100, and a reference sign Z denotes an up-down direction of the battery 100. These directions are defined however for convenience of explanation, and do not limit the manner in which the battery 100 is disposed.

As illustrated in FIG. 1 to FIG. 3, the battery 100 includes a battery case 10 (see FIG. 1), a plurality of wound electrode bodies 20 (see FIG. 2 and FIG. 3), a positive electrode terminal 30 (see FIG. 1 and FIG. 2), a negative electrode terminal 40 (see FIG. 1 and FIG. 2), a positive electrode current collecting part 50 (see FIG. 2), and a negative electrode current collecting part 60 (see FIG. 2). Although illustration is omitted, the battery 100 further includes an electrolyte solution here. The battery 100 is a nonaqueous electrolyte secondary battery. A specific structure of the battery 100 is hereinafter described.

The battery case 10 is a housing that accommodates the wound electrode bodies 20. As illustrated in FIG. 1, the external shape of the battery case 10 here is a flat and bottomed cuboid shape (rectangular shape). A conventionally used material can be used for the battery case 10, without particular limitations. The battery case 10 is preferably made of metal, and for example, more preferably made of aluminum, an aluminum alloy, iron, an iron alloy, or the like. As illustrated in FIG. 2, the battery case 10 includes an exterior body 12 having an opening 12*h*, and a sealing plate (lid body) 14 that seals the opening 12*h*. Each of the exterior body 12 and the sealing plate 14 has the size in accordance with the number of wound electrode bodies 20 to be accommodated (one or more, here more than one) and the size of the wound electrode bodies 20, for example.

As can be seen from FIG. 1 and FIG. 2, the exterior body 12 is a bottomed and rectangular container with the opening 12*h* on an upper surface thereof. As illustrated in FIG. 1, the exterior body 12 includes a bottom wall 12*a*, a pair of long side walls 12*b* extending upward from long sides of the bottom wall 12*a* and facing each other, and a pair of short side walls 12*c* extending upward from short sides of the bottom wall 12*a* and facing each other. The bottom wall 12*a* is substantially rectangular in shape. The bottom wall 12*a* faces the opening 12*h* (see FIG. 2). The long side walls 12*b* and the short side walls 12*c* are one example of "side wall". The sealing plate 14 is a plate-shaped member that is attached to the exterior body 12 so as to cover the opening 12*h* of the exterior body 12, and is substantially rectangular in a plan view. The sealing plate 14 faces the bottom wall 12*a* of the exterior body 12. The sealing plate 14 is substantially rectangular in shape. The battery case 10 is unified in a manner that the sealing plate 14 is joined (for example, joined by welding) to a periphery of the opening 12*h* of the exterior body 12. In this way, the battery case 10 is hermetically sealed (closed).

As illustrated in FIG. 2, a liquid injection hole 15, a gas discharge valve 17, and terminal extraction holes 18 and 19 are provided in the sealing plate 14. The liquid injection hole 15 is a penetration hole for injecting the electrolyte solution inside the battery case 10 after the sealing plate 14 is assembled to the exterior body 12. The liquid injection hole 15 is sealed by a sealing member 16 after the injection of the electrolyte solution. The gas discharge valve 17 is a thin part that is configured to break when the pressure in the battery case 10 becomes more than or equal to a predetermined value so as to discharge the gas out of the battery case 10.

The electrolyte solution may be any electrolyte solution used in the conventionally known batteries, without particular limitations. One example thereof is a nonaqueous electrolyte solution in which a supporting salt is dissolved in a nonaqueous solvent. Examples of the nonaqueous solvent include carbonate solvents such as ethylene carbonate, dimethyl carbonate, and ethyl methyl carbonate. One example of the supporting salt is fluorine-containing lithium salt such as $LiPF_6$. The electrolyte solution may contain an additive as necessary. According to the present inventors' examination, in the case where the battery 100 includes the electrolyte solution, in other words, the battery 100 is a nonaqueous electrolyte secondary battery, the effect of the art disclosed herein can be achieved at a higher level, which will be described in detail below about the wound electrode body 20.

The positive electrode terminal 30 is attached to one end part of the sealing plate 14 in the long side direction Y (left end part in FIG. 1 and FIG. 2). The negative electrode terminal 40 is attached to the other end part of the sealing plate 14 in the long side direction Y (right end part in FIG. 1 and FIG. 2). The positive electrode terminal 30 and the negative electrode terminal 40 are inserted into the terminal extraction holes 18 and 19 and are exposed to an external surface of the sealing plate 14. The positive electrode terminal 30 is electrically connected to a positive electrode external conductive member 32 with a plate shape outside the battery case 10. The negative electrode terminal 40 is electrically connected to a negative electrode external conductive member 42 with a plate shape outside the battery case 10. The positive electrode external conductive member 32 and the negative electrode external conductive member 42 are connected to other secondary battery or external device through an external connection member such as a busbar. The positive electrode external conductive member 32 and the negative electrode external conductive member 42 are preferably formed of metal with excellent conductivity, such as aluminum, an aluminum alloy, copper, or a copper alloy. However, the positive electrode external conductive member 32 and the negative electrode external conductive member 42 are not always necessary and can be omitted in another embodiment.

As illustrated in FIG. 3 and FIG. 4, the battery 100 according to the present embodiment includes a plurality of (specifically, two) wound electrode bodies 20 within the battery case 10. The number of wound electrode bodies to be disposed in one exterior body 12 is, however, not limited in particular and may be three or more (plural), or one. As for the detailed structure of the wound electrode body 20, which is described below, a positive electrode tab group 25 and a negative electrode tab group 27 protrude over the wound electrode body 20 as illustrated in FIG. 2. The battery 100 has a so-called upper tab structure in which the positive electrode tab group 25 and the negative electrode tab group 27 exist over the wound electrode body 20. As illustrated in FIG. 4, the positive electrode tab group 25 is bent while being bonded with the positive electrode current collecting part 50. Although the illustration is omitted, the negative electrode tab group 27 is similarly bent while being bonded with the negative electrode current collecting part 60.

The positive electrode current collecting part 50 electrically connects between the positive electrode terminal 30 and the positive electrode tab group 25 of the wound electrode body 20. As illustrated in FIG. 2, the positive electrode current collecting part 50 is a plate-shaped conductive member extending in the long side direction Y along an inner side surface of the sealing plate 14. One end part (right side in FIG. 2) of the positive electrode current collecting part 50 is electrically connected to the positive electrode tab group 25. The other end part (left side in FIG. 2) of the positive electrode current collecting part 50 is electrically connected to a lower end part 30*c* of the positive electrode terminal 30. The positive electrode terminal 30 and the positive electrode current collecting part 50 are preferably formed of metal with excellent conductivity, such as aluminum or an aluminum alloy.

The negative electrode current collecting part 60 electrically connects between the negative electrode terminal 40 and the negative electrode tab group 27 of the wound electrode body 20. As illustrated in FIG. 2, the negative electrode current collecting part 60 is a plate-shaped conductive member extending in the long side direction Y along the inner side surface of the sealing plate 14. One end part (left side in FIG. 2) of the negative electrode current collecting part 60 is electrically connected to the negative electrode tab group 27. The other end part (right side in FIG. 2) of the negative electrode current collecting part 60 is electrically connected to a lower end part 40*c* of the negative electrode terminal 40. The negative electrode terminal 40 and the negative electrode current collecting part 60 are preferably formed of metal with excellent conductivity, such as copper or a copper alloy.

For the battery 100, various insulating members are used to prevent conduction between the wound electrode body 20 and the battery case 10. For example, as illustrated in FIG. 1, the positive electrode external conductive member 32 and the negative electrode external conductive member 42 are insulated from the sealing plate 14 by an external insulating member 92. Additionally, as illustrated in FIG. 2, a gasket 90 is attached to each of the terminal extraction holes 18 and 19 of the sealing plate 14. Thus, the conduction between the sealing plate 14, and the positive electrode terminal 30 and the negative electrode terminal 40 inserted into the terminal extraction holes 18 and 19 can be prevented. Moreover, between the positive electrode current collecting part 50 and the negative electrode current collecting part 60, and the inner surface side of the sealing plate 14, an internal insulating member 94 is disposed. Thus, the conduction between the positive electrode current collecting part 50 and the negative electrode current collecting part 60, and the sealing plate 14 can be prevented. The internal insulating member 94 may include a protrusion part that protrudes toward the wound electrode body 20, which will be described below in a second embodiment.

Moreover, the wound electrode bodies 20 are disposed inside the exterior body 12 in a state of being covered with an electrode body holder 29 made of an insulating resin sheet (see FIG. 3). Thus, the direct contact between the wound electrode body 20 and the exterior body 12 can be prevented. Note that the material of each insulating member described above is not limited in particular as long as the material has a predetermined insulating property. Examples of such a material include synthetic resin materials including polyolefin resins such as polypropylene (PP) and polyethylene (PE), and fluorine resins such as perfluoroalkoxy alkane and polytetrafluoroethylene (PTFE).

Figure 5:
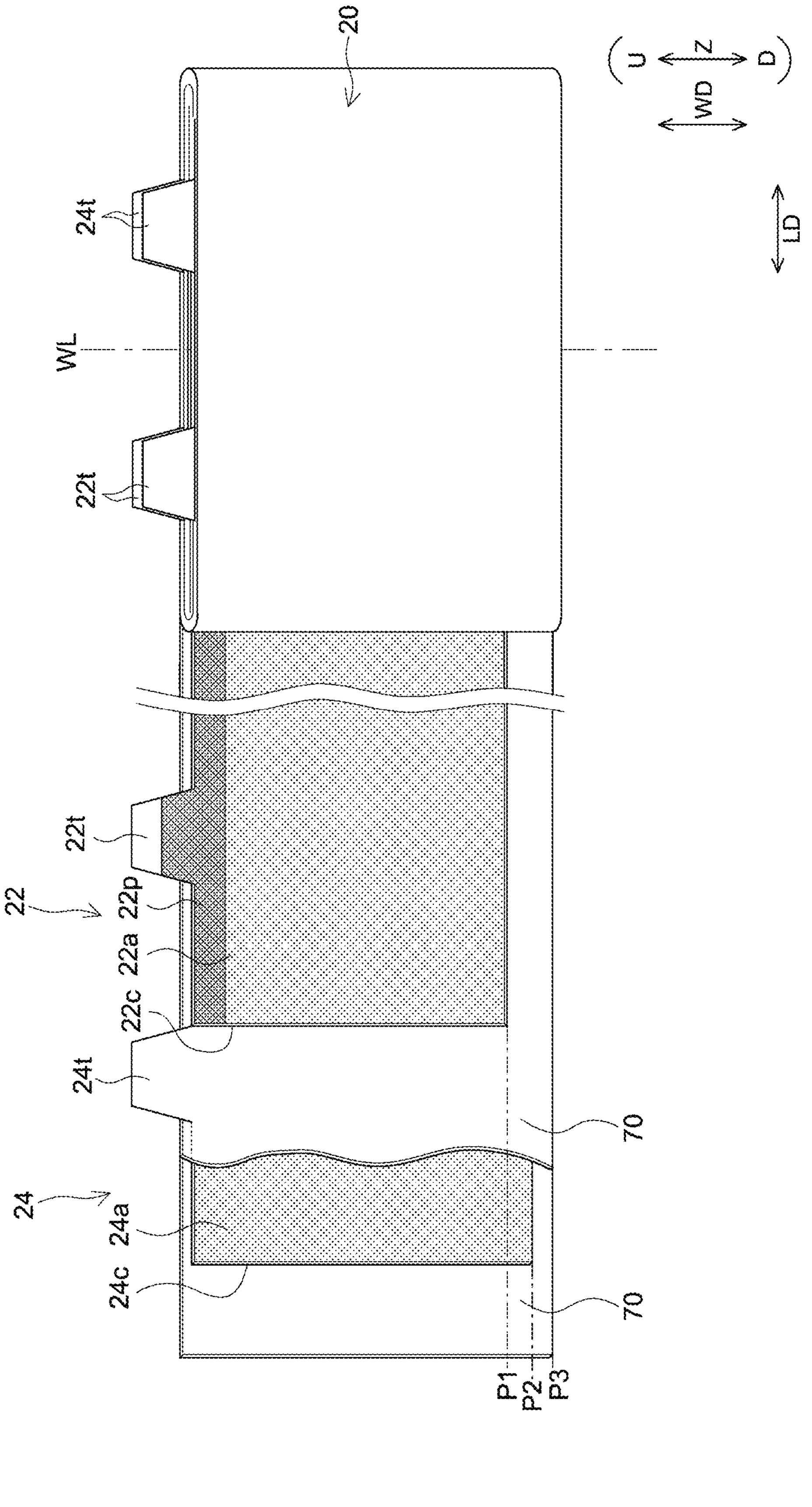
FIG. 5 is a schematic view illustrating a structure of a wound electrode body according to the first embodiment.

FIG. 5 is a schematic view illustrating a structure of the wound electrode body 20. As illustrated in FIG. 5, the wound electrode body 20 has a structure in which a positive electrode 22 with a band shape and a negative electrode 24 with a band shape are stacked in an insulated state across two separators 70 with a band shape and wound in a longitudinal direction using a winding axis WL as a center. A reference sign LD in FIG. 5, etc. denotes the longitudinal direction (that is, conveying direction) of the wound electrode body 20 and the separator 70 that are manufactured into the band shape. A reference sign WD denotes a direction that is substantially orthogonal to the longitudinal direction LD and corresponds to a winding axis direction (also width direction) of the wound electrode body 20 and the separator 70. The winding axis direction WD is substantially parallel to the up-down direction Z of the battery 100 described above.

The external shape of the wound electrode body 20 is a flat shape here. The wound electrode body 20 preferably has a flat shape. The wound electrode body 20 with the flat shape can be formed by, for example, press-molding an electrode body wound into a tubular shape (tubular body) in a flat shape. The wound electrode body 20 with a flat shape includes a pair of curved parts 20*r* whose outer surface is curved and a pair of flat parts 20*f* whose outer surface is flat for coupling the pair of curved parts 20*r* as illustrated in FIG. 3.

In the battery 100, the wound electrode body 20 is accommodated inside the battery case 10 so that the winding axis direction WD substantially coincides with the up-down direction Z. In other words, the wound electrode body 20 is disposed inside the battery case 10 so that the winding axis direction WD is substantially parallel to the long side walls 12*b* and the short side walls 12*c* and is substantially orthogonal to the bottom wall 12*a* and the sealing plate 14. As illustrated in FIG. 3, the pair of curved parts 20*r* face the pair of short side walls 12*c* of the exterior body 12. The pair of flat parts 20*f* face the long side walls 12*b* of the exterior body 12. End surfaces of the wound electrode body 20 (that is, stacked surfaces where the positive electrode 22 and the negative electrode 24 are stacked, opposite end parts in the winding axis direction WD in FIG. 5) face the bottom wall 12*a* and the sealing plate 14.

Figure 6:
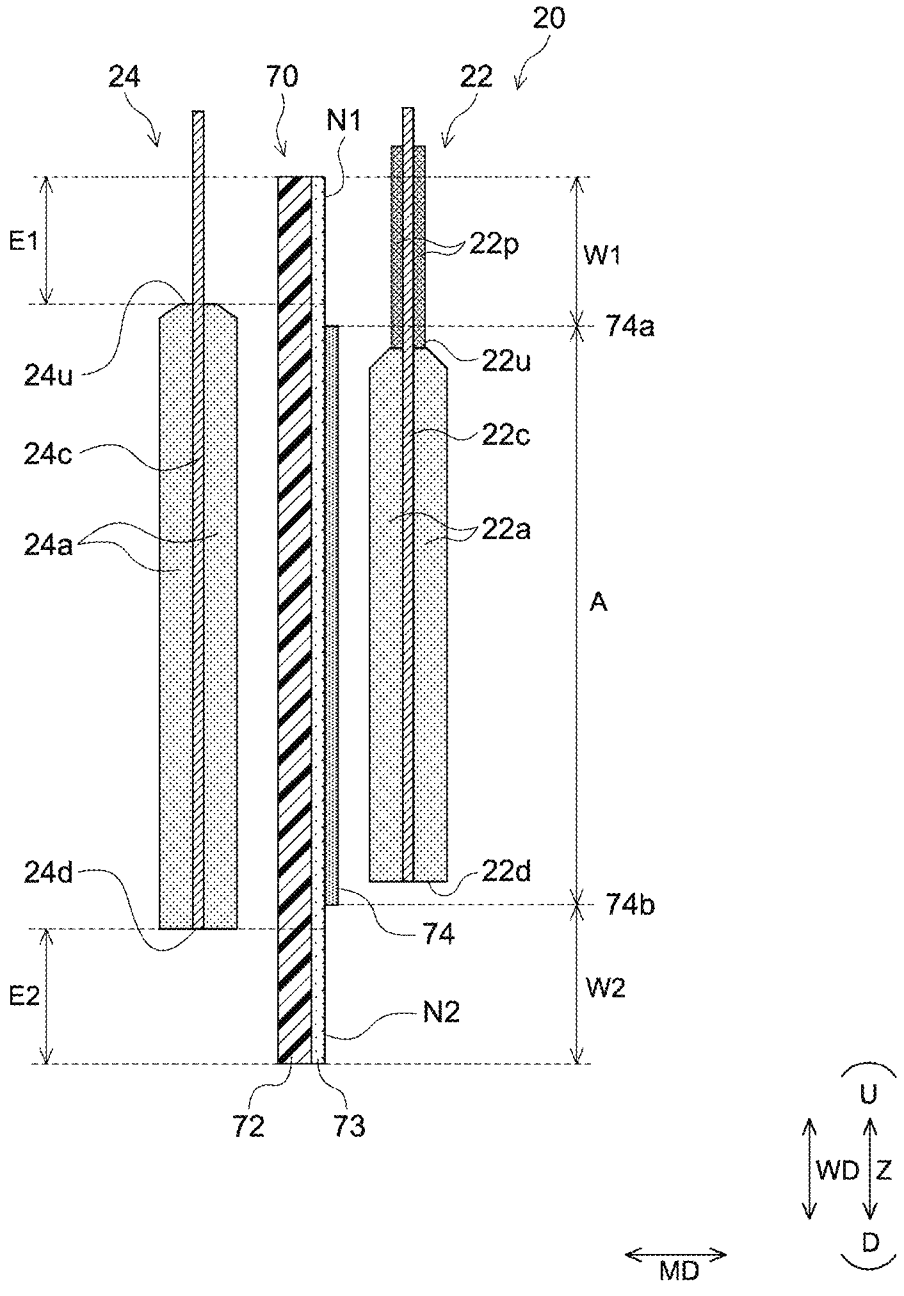
FIG. 6 is a magnified view schematically illustrating interfaces among a positive electrode, a negative electrode, and a separator.

FIG. 6 is a magnified view schematically illustrating interfaces among the positive electrode 22, the negative electrode 24, and the separator 70 in the wound electrode body 20. Note that a reference sign MD in FIG. 6 denotes a stacking direction of the wound electrode body 20, and corresponds to a direction that is substantially parallel to the short side direction X of the battery 100 described above. A specific structure of the wound electrode body 20 in the present embodiment is hereinafter described.

The positive electrode 22 is a band-shaped member as illustrated in FIG. 5. The positive electrode 22 includes a positive electrode current collector 22c with a band shape, and a positive electrode active material layer 22a and a positive electrode protection layer 22p that are fixed on at least one surface of the positive electrode current collector 22c. As illustrated in FIG. 6, the positive electrode 22 faces an adhesive layer 74 of the separator 70. At least a part of the positive electrode 22 is attached to the separator 70. The positive electrode active material layer 22a is preferably formed on both surfaces of the positive electrode current collector 22c from the viewpoint of the battery performance.

For each member of the positive electrode 22, conventionally known materials that can be used for general batteries (for example, lithium ion secondary batteries) can be used without particular limitations. For example, the positive electrode current collector 22c is preferably formed of conductive metal such as aluminum, an aluminum alloy, nickel, or stainless steel, and here, a metal foil, specifically an aluminum foil is used.

As illustrated in FIG. 5, in the positive electrode 22, a plurality of positive electrode tabs 22t protrude from one end side in the winding axis direction WD to the outside (upper side in FIG. 5). The positive electrode tabs 22t are provided with a predetermined space (intermittently) along the longitudinal direction LD. The positive electrode tabs 22t constitute a part of the positive electrode 22 here. The positive electrode tab 22t is a region where the positive electrode active material layer 22a is not formed. In a part of the positive electrode tabs 22t, here, the positive electrode protection layer 22p is provided. However, the positive electrode protection layer 22p may be omitted in the positive electrode tabs 22t. In at least a part of the positive electrode tabs 22t, the positive electrode current collector 22c is exposed. The positive electrode tabs 22t and the positive electrode 22 may be different members.

Each of the positive electrode tabs 22t has a trapezoidal shape here. The shape of the positive electrode tab 22t is, however, not limited to this shape. Moreover, the size of the positive electrode tabs 22t is not limited in particular. The shape and size of the positive electrode tab 22t can be adjusted as appropriate depending on the formation position and the like in consideration of, for example, how the positive electrode tab 22t is connected to the positive electrode current collecting part 50. The positive electrode tabs 22t are stacked at one end part of the positive electrode 22 in the winding axis direction WD (upper end part in FIG. 5) and form the positive electrode tab group 25 (see FIG. 2).

The positive electrode active material layer 22a is formed to have a band shape along the longitudinal direction LD of the positive electrode current collector 22c as illustrated in FIG. 5. The width of the positive electrode active material layer 22a (the length in the winding axis direction WD, which similarly applies to the description below) is smaller than the width of a negative electrode active material layer 24a. The positive electrode active material layer 22a includes a positive electrode active material that is capable of reversibly storing and releasing charge carriers. The positive electrode active material is preferably a lithium-transition metal complex oxide, and more preferably contains Ni. Examples of the lithium-transition metal complex oxide containing Ni include a lithium-nickel-cobalt-manganese complex oxide. Furthermore, the positive electrode active material layer 22a may contain an optional component other than the positive electrode active material, such as a binder, a conductive material, or various additive components. The positive electrode active material layer 22a preferably contains the binder and the conductive material in addition to the positive electrode active material. The binder is typically made of resin and preferably a fluorine resin such as polyvinylidene fluoride (PVdF) in particular. The conductive material is preferably a carbon material such as acetylene black (AB).

The positive electrode protection layer 22p is a layer formed to have lower electric conductivity than the positive electrode active material layer 22a. The positive electrode protection layer 22p is provided in a band shape along the longitudinal direction LD of the positive electrode current collector 22c as illustrated in FIG. 5. The positive electrode protection layer 22p is provided at a border part between the positive electrode current collector 22c and the positive electrode active material layer 22a in the winding axis direction WD. The positive electrode protection layer 22p is provided at one end part of the positive electrode current collector 22c in the winding axis direction WD, specifically at an end part on the side where the positive electrode tabs 22t exist (upper end part in FIG. 5), here. The provision of the positive electrode protection layer 22p can prevent the internal short-circuiting of the battery 100 due to the direct contact between the positive electrode 22 and the negative electrode active material layer 24a at the damage of the separator 70.

The positive electrode protection layer 22p contains inorganic filler with an insulation property. One example of the inorganic filler is ceramic particles of alumina or the like. The positive electrode protection layer 22p may contain an optional component other than the inorganic filler, such as a binder, a conductive material, or various additive components. The binder and the conductive material may be the same as those described as the examples that may be contained in the positive electrode active material layer 22a. However, the positive electrode protection layer 22p is not always necessary and can be omitted in another embodiment.

The negative electrode 24 is a band-shaped member as illustrated in FIG. 5. The negative electrode 24 includes a negative electrode current collector 24c with a band shape, and the negative electrode active material layer 24a that is fixed on at least one surface of the negative electrode current collector 24c. As illustrated in FIG. 6, the negative electrode 24 faces a base material layer 72 of the separator 70 here. The negative electrode 24 may be attached to the base material layer 72 of the separator 70. The negative electrode active material layer 24a is preferably formed on both surfaces of the negative electrode current collector 24c from the viewpoint of the battery performance.

For each member of the negative electrode 24, conventionally known materials that can be used for general batteries (for example, lithium ion secondary batteries) can be used without particular limitations. For example, the negative electrode current collector 24c is preferably formed of conductive metal such as copper, a copper alloy, nickel, or stainless steel, and here, a metal foil, specifically a copper foil is used.

As illustrated in FIG. 5, in the negative electrode 24, negative electrode tabs 24t protrude from one end side in the winding axis direction WD to the outside (upper side in FIG. 5). The negative electrode tabs 24t are provided with a predetermined space (intermittently) along the longitudinal direction LD. The negative electrode tab 24t is provided at the end part on the same side as the positive electrode tab 22t in the winding axis direction WD. The negative electrode tabs 24*t* constitute a part of the negative electrode 24 here. The negative electrode tab 24*t* is a region where the negative electrode active material layer 24*a* is not formed and the negative electrode current collector 24*c* is exposed. However, a part of the negative electrode active material layer 24*a* may protrude and adhere to the negative electrode tab 24*t*. Alternatively, the negative electrode tab 24*t* and the negative electrode 24 may be different members.

Each of the negative electrode tabs 24*t* has a trapezoidal shape here. However, the shape and size of the negative electrode tabs 24*t* can be adjusted as appropriate similarly to the positive electrode tabs 22*t*. The negative electrode tabs 24*t* are stacked at one end part of the negative electrode 24 in the winding axis direction WD (upper end part in FIG. 5) and form the negative electrode tab group 27 (see FIG. 2).

The negative electrode active material layer 24*a* is formed to have a band shape along the longitudinal direction LD of the negative electrode current collector 24*c* as illustrated in FIG. 5. The width of the negative electrode active material layer 24*a* (the length in the winding axis direction WD, which similarly applies to the description below) is larger than the width of the positive electrode active material layer 22*a*. The negative electrode active material layer 24*a* includes a negative electrode active material that is capable of reversibly storing and releasing the charge carriers. The negative electrode active material is preferably, for example, a carbon material such as graphite or a silicon material. The negative electrode active material layer 24*a* may contain an optional component other than the negative electrode active material, such as a binder, a conductive material, or various additive components. The negative electrode active material layer 24*a* preferably contains the binder in addition to the negative electrode active material. The binder preferably contains rubbers such as styrene butadiene rubber (SBR) or celluloses such as carboxymethyl cellulose (CMC). The negative electrode active material layer 24*a* may contain a carbon material as the conductive material as necessary.

As illustrated in FIG. 5, the separator 70 is a band-shaped member. The separator 70 is an insulating sheet including a plurality of small penetration holes through which the charge carriers can pass. The width of the separator 70 is larger than that of the negative electrode active material layer 24*a*. The provision of the separator 70 between the positive electrode 22 and the negative electrode 24 can prevent the contact between the positive electrode 22 and the negative electrode 24, and enables the charge carriers (such as lithium ion) to move between the positive electrode 22 and the negative electrode 24.

Here, two separators 70 are used for one wound electrode body 20. As described in this embodiment, one wound electrode body 20 preferably includes two separators 70, that is, a first separator and a second separator. The art disclosed herein is applied to at least one of the first separator and the second separator, and is preferably applied to both. Moreover, the two separators, which have the similar structure here, may have different structures.

As illustrated in FIG. 6, the separator 70 includes the base material layer 72 and the adhesive layer 74 formed on a surface of the base material layer 72 that faces the positive electrode 22. Here, a heat-resistant layer 73 is additionally provided between the base material layer 72 and the adhesive layer 74. The adhesive layer 74 forms an outermost surface on the side facing the positive electrode 22. The separator 70 is unified with the positive electrode 22 in a manner that, for example, the adhesive layer 74 is attached to (for example, crimped to) the positive electrode 22 by heating, press-molding, or the like. This makes it difficult for the separator 70 to peel off and the workability at the construction of the battery 100 can be improved. Moreover, the mixing of a foreign substance between the separator 70 and the positive electrode 22 can be suppressed and the occurrence of micro short-circuiting caused by a metal foreign substance can be suppressed. Furthermore, the separator 70 will not be displaced easily under the impact at the vibration or drop, for example, during the use of the battery 100, and thus, the vibration resistance can be improved.

The separator 70 may include the heat-resistant layer 73 and/or the adhesive layer 74 on the surface facing the negative electrode 24, or may exclude the heat-resistant layer 73 and/or the adhesive layer 74 on the surface facing the negative electrode 24. As illustrated in FIG. 6, the separator 70 here includes neither the heat-resistant layer 73 nor the adhesive layer 74 on the surface facing the negative electrode 24. It is preferable that the separator 70 do not include the heat-resistant layer 73 on the surface facing the negative electrode 24. It is preferable that the separator 70 do not include the adhesive layer 74 on the surface facing the negative electrode 24. The base material layer 72 forms the outermost surface on the side facing the negative electrode 24 here. The negative electrode 24 preferably faces the base material layer 72. The separator 70 may adhere to the negative electrode 24 through the base material layer 72, for example.

In the case of including the adhesive layer 74 on the surface facing the negative electrode 24, it is preferable that the formation area of the adhesive layer 74 be smaller than the area of the surface facing the positive electrode 22. For example, when the entire area of the region of the separator 70 that faces the negative electrode 24 (negative electrode active material layer 24*a* in particular) is 100%, the ratio of the area of the region where the adhesive layer 74 is formed (adhesive layer formation region) may be generally 50% or less, preferably 30% or less, more preferably 10% or less, still more preferably 5% or less, and for example, substantially 0%.

As the base material layer 72, a microporous film that can be used for the separators of the conventionally known batteries can be used without particular limitations. The base material layer 72 is preferably formed of a porous sheet-shaped member. The base material layer 72 may have a single-layer structure or a structure including two or more layers, for example three layers. Regarding the base material layer 72, at least a surface thereof that faces the negative electrode 24 is preferably formed of a polyolefin resin. The base material layer 72 is more preferably formed of the polyolefin resin entirely. Thus, the flexibility of the separator 70 can be secured sufficiently, and the manufacture (winding and press-molding) of the wound electrode body 20 can be performed easily. As the polyolefin resin, polyethylene (PE), polypropylene (PP), or a mixture thereof is preferable and PE is more preferable.

Although not particularly limited, the thickness of the base material layer 72 (length in a stacking direction MD, this similarly applies to the description below) is preferably 3 to 25 more preferably 3 to 18 and still more preferably 5 to 14 The air permeance of the base material layer 72 is preferably 30 to 500 sec/100 cc, more preferably 30 to 300 sec/100 cc, and still more preferably 50 to 200 sec/100 cc. The base material layer 72 may have the adhesiveness of such a degree that the base material layer 72 is attached to the negative electrode active material layer 24*a* by heating, press-molding, or the like, for example.

The heat-resistant layer 73 is provided on the base material layer 72. The heat-resistant layer 73 is preferably formed on the base material layer 72. The heat-resistant layer 73 may be provided directly on the surface of the base material layer 72 or may be provided on the base material layer 72 through another layer. However, the heat-resistant layer 73 is not always necessary and can be omitted in another embodiment. The heat-resistant layer 73 is provided on the entire surface of the base material layer 72 that faces the positive electrode 22. Thus, the thermal contraction of the separator 70 can be suppressed more suitably and the safety of the battery 100 can be improved. The heat-resistant layer 73 does not have the adhesiveness of such a degree that the heat-resistant layer 73 is attached to the positive electrode active material layer 22*a* by heating, press-molding, or the like, for example. The weight per area of the heat-resistant layer 73 is uniform in the longitudinal direction LD and the winding axis direction WD of the separator 70. Although not particularly limited, the thickness of the heat-resistant layer 73 is preferably 0.3 to 6 more preferably 0.5 to 6 and still more preferably 1 to 4 The heat-resistant layer 73 preferably contains inorganic filler and a heat-resistant layer binder.

As the inorganic filler, the conventionally known ones that have been used in this kind of application can be used without particular limitations. The inorganic filler preferably contains insulating ceramic particles. In particular, in consideration of the heat resistance, the availability, and the like, inorganic oxides such as alumina, zirconia, silica, and titania, metal hydroxides such as aluminum hydroxide, and clay minerals such as boehmite are preferable, and alumina and boehmite are more preferable. From the viewpoint of suppressing the thermal contraction of the separator 70, a compound containing aluminum is particularly preferable. The ratio of the inorganic filler to the total mass of the heat-resistant layer 73 is preferably 85 mass % or more, more preferably 90 mass % or more, and still more preferably 95 mass % or more.

As the heat-resistant layer binder, the conventionally known ones that have been used in this kind of application can be used without particular limitations. Specific examples thereof include an acrylic resin, a fluorine resin, an epoxy resin, a urethane resin, an ethylene vinyl acetate resin, and the like. In particular, the acrylic resin is preferable.

The adhesive layer 74 is provided on the surface that faces the positive electrode 22 and is in contact with the positive electrode 22. As illustrated in FIG. 6, the adhesive layer 74 is preferably formed on at least the surface of the separator 70 on the side of the positive electrode 22. Thus, the effect as described above can be achieved more. The adhesive layer 74 is attached to the positive electrode 22 by, for example, heating, pressing (typically press-molding), or the like.

The adhesive layer 74 is provided on the heat-resistant layer 73, here. The adhesive layer 74 is preferably formed on the heat-resistant layer 73. The adhesive layer 74 may be provided directly on the surface of the heat-resistant layer 73 or may be provided on the heat-resistant layer 73 through another layer. The adhesive layer 74 may be provided directly on the surface of the base material layer 72 or may be provided on the base material layer 72 through a layer other than the heat-resistant layer 73. The structure of the adhesive layer 74 is not limited in particular and may be similar to the conventionally known one. The adhesive layer 74 may be a layer having higher affinity for the electrolyte solution than, for example, the heat-resistant layer 73 and swelling by absorbing the electrolyte solution. The adhesive layer 74 includes an adhesive layer binder.

As the adhesive layer binder, the conventionally known resin material with a certain degree of viscosity for the positive electrode 22 can be used without particular limitations. Specific examples include an acrylic resin, a fluorine resin, an epoxy resin, a urethane resin, ethylene vinyl acetate resin, and the like. In particular, the fluorine resin and the acrylic resin are preferable because of having high flexibility and being able to achieve the adhesiveness to the positive electrode 22 more suitably. Examples of the fluorine resin include polyvinylidene fluoride (PVdF), polytetrafluoroethylene (PTFE), and the like. The kind of the adhesive layer binder may be either the same as or different from the heat-resistant layer binder. The ratio of the heat-resistant layer binder to the total mass of the adhesive layer 74 is preferably 20 mass % or more, 50 mass % or more, and more preferably 70 mass % or more. Thus, predetermined adhesiveness for the positive electrode 22 can be achieved suitably and the separator 70 is deformed easily in the press-molding.

The adhesive layer 74 may contain another material, for example, inorganic filler or the like given as the component of the heat-resistant layer 73 in addition to the adhesive layer binder. In a case where the adhesive layer 74 contains the inorganic filler, the ratio of the inorganic filler to the total mass of the adhesive layer 74 is preferably 80 mass % or less, more preferably 50 mass % or less, and still more preferably 30 mass % or less.

Figure 7:
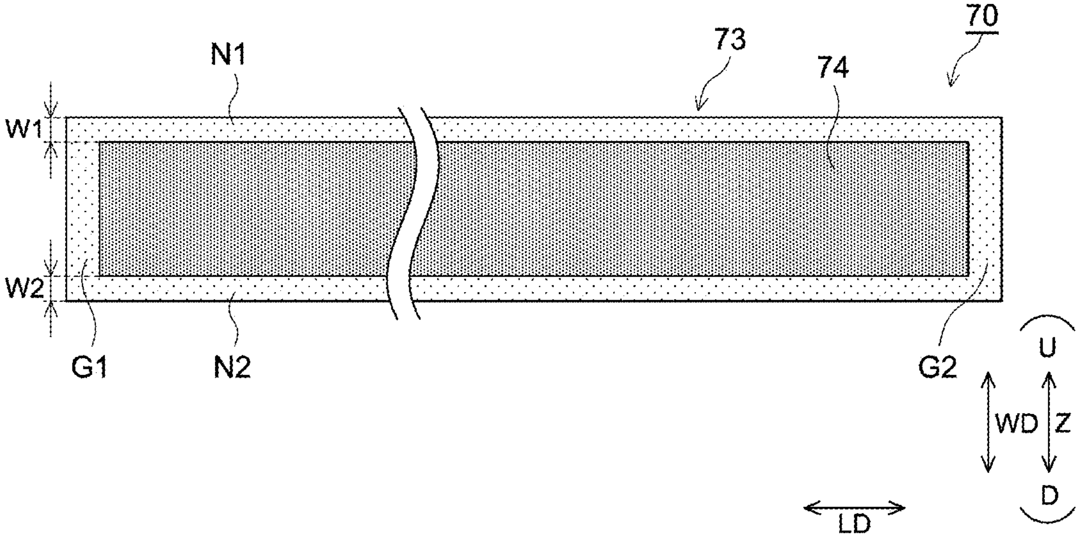
FIG. 7 is a plan view illustrating a surface of the separator on a side that faces the positive electrode.

FIG. 7 is a plan view illustrating the surface of the separator 70 that is on the side facing the positive electrode 22. As illustrated in FIG. 7, the adhesive layer 74 is formed to be smaller in area than the heat-resistant layer 73 in a plan view, which will be described in detail below. The heat-resistant layer 73 is exposed to a part of the surface of the separator 70 on the positive electrode 22 side. The adhesive layer 74 is provided at a central part in the winding axis direction WD. The adhesive layer 74 is formed in a linear shape (band shape) with a predetermined width along the longitudinal direction LD of the separator 70. The adhesive layer 74 may be, however, sectioned into a plurality of regions in, for example, the winding axis direction WD and/or the longitudinal direction LD and the regions may have different properties (for example, shape, weight per area, and the like).

The surface of the adhesive layer 74 may be flat (so-called solid painting) or uneven (partially different in thickness). In the region where the adhesive layer 74 is formed, the adhesive layer 74 itself may be formed partially. In a plan view, the adhesive layer 74 may be formed to have, for example, a dot shape, a stripe shape, a wavy shape, a band (strip) shape, a dotted line shape, a combination of these, or the like. Thus, the impregnation of the wound electrode body 20 with the electrolyte solution can be improved. Note that, in the present specification, "formed in a linear shape" means that the formation region is linear and the adhesive layer 74 itself may have a dot shape or the like as described above.

The adhesive layer 74 is provided so as to face at least a part of the positive electrode active material layer 22*a* as illustrated in FIG. 6. A width A of the adhesive layer 74 here is larger than the width of the positive electrode active material layer 22*a* and the adhesive layer 74 is provided so as to cover the positive electrode active material layer 22*a*. An end part of the positive electrode active material layer 22*a* is preferably in contact with the adhesive layer 74. Although not particularly limited, the ratio of the width A of the adhesive layer 74 to the width of the positive electrode active material layer 22*a* is preferably 1.05 or more. Thus, the mixing of a foreign substance between the separator 70 and the positive electrode active material layer 22*a* can be suppressed at a high level. In addition, the width A of the adhesive layer 74 is smaller than the width of the negative electrode active material layer 24*a* here. Although not particularly limited, the ratio of the width A of the adhesive layer 74 to the width of the negative electrode active material layer 24*a* is preferably 0.95 to 1.0 and more preferably 0.98 or less, for example.

In the art disclosed herein, the formation region of the adhesive layer 74 is optimized. Specifically, a non-formation region where the adhesive layer 74 is not formed is provided in at least one end part of the separator 70 in the winding axis direction WD. Thus, the usage of the adhesive that is unnecessary can be reduced and the cost for manufacturing the battery can be reduced. Additionally, the end part in the winding axis direction WD, for example the region that does not face the positive electrode active material layer 22*a* is a part that does not contribute to the battery reaction. Providing non-formation regions N1 and N2 in such a part can prevent the electrolyte solution from being deprived by absorption by the adhesive layer 74 in the part that does not contribute to the battery reaction. Accordingly, the electrolyte solution does not become insufficient easily in the part that contributes to the battery reaction, particularly in the region where the positive electrode active material layer 22*a* and the negative electrode active material layer 24*a* face each other, and thus, the battery 100 with high reliability can be achieved. Additionally, since it is unnecessary to inject the electrolyte solution more than necessary in the battery reaction, the cost for manufacturing the battery can be reduced more. Furthermore, when the adhesive layer 74 is formed, the protrusion of the adhesive layer binder from the separator 70 and scattering to the periphery of an application device can be suppressed.

As illustrated in FIG. 6 and FIG. 7, the non-formation region is provided at both end parts of the separator 70 in the winding axis direction WD here. That is to say, the first non-formation region N1 is provided at one end part in the winding axis direction WD (upper end part in FIG. 6 and FIG. 7) and the second non-formation region N2 is provided at the other end part in the winding axis direction WD (lower end part in FIG. 6 and FIG. 7).

The first non-formation region N1 is provided in a band shape at the upper end part of the separator 70 along the longitudinal direction LD of the separator 70 as illustrated in FIG. 7. The first non-formation region N1 is formed in parallel to the adhesive layer 74. In the first non-formation region N1, the adhesive layer 74 is not formed and the heat-resistant layer 73 is exposed. In the wound electrode body 20, the first non-formation region N1 is disposed closer to the electrode tab group (the positive electrode tab group 25 and the negative electrode tab group 27) than the adhesive layer 74 and the second non-formation region N2. The first non-formation region N1 forms a tab-side end part of the separator 70. In the battery 100, the first non-formation region N1 is disposed closer to the sealing plate 14 than the adhesive layer 74 and the second non-formation region N2.

As illustrated in FIG. 6, a lower end 74*a* of the first non-formation region N1 (an end part on a central side in the winding axis direction WD, also corresponding to an upper end of the adhesive layer 74 here) exists above an upper end 22*u* of the positive electrode active material layer 22*a* that faces the adhesive layer 74 (on an end side in the winding axis direction WD). The first non-formation region N1 faces the positive electrode protection layer 22*p*. Thus, the contact and rubbing between the positive electrode tab 22*t* and the separator 70 (the adhesive layer 74 in particular) can be prevented and the damage of the positive electrode tab 22*t* can be suppressed.

The upper end 22*u* of the positive electrode active material layer 22*a* is in contact with the adhesive layer 74 here. The first non-formation region N1 does not face the positive electrode active material layer 22*a*. Thus, the aforementioned effect, for example, at least one of the effect of suppressing the peel-off of the separator 70, the effect of preventing the mixing of a foreign substance, and the effect of improving the vibration resistance can be achieved at a high level. The first non-formation region N1, however, may face the positive electrode active material layer 22*a*. In other words, the lower end 74*a* of the first non-formation region N1 may exist below the upper end 22*u* of the positive electrode active material layer 22*a* (on the central side in the winding axis direction WD).

The lower end 74*a* of the first non-formation region N1 exists below an upper end 24*u* of the negative electrode active material layer 24*a* (on the central side in the winding axis direction WD). The first non-formation region N1 is provided so that the position thereof in the winding axis direction WD overlaps with the negative electrode active material layer 24*a*. Usually, charging the battery 100 makes the negative electrode active material layer 24*a* swell, causing the positive electrode active material layer 22*a* to release the electrolyte solution mainly from the upper end 22*u*. The released electrolyte solution stays in a part where the positive electrode active material layer 22*a* and the negative electrode active material layer 24*a* do not face each other. Discharging the battery 100 makes the released electrolyte solution return to the positive electrode active material layer 22*a*. Here, when the first non-formation region N1 overlaps with the negative electrode active material layer 24*a*, the electrolyte solution transfers smoothly as charging and discharging proceed, and for example, the battery performance such as a high-rate charging and discharging characteristic can be improved.

A width W1 of the first non-formation region N1 is preferably larger than the entire thickness of the negative electrode 24 that faces the first non-formation region N1 or the entire thickness of the positive electrode 22 that faces the first non-formation region Ni. Thus, the upper end of the negative electrode 24 or the positive electrode 22 can be covered with the separator 70 easily and the aforementioned effect of preventing the mixing of a foreign substance can be achieved at the higher level. Note that "entire thickness" refers to the total thickness of the negative electrode current collector 24*c* and the negative electrode active material layer 24*a* in the stacking direction MD. In the case where the negative electrode active material layer 24*a* is formed on both surfaces of the negative electrode current collector 24*c* as described in the present embodiment, the entire thickness corresponds to the total of the thickness of the negative electrode current collector 24*c* and the thickness of the negative electrode active material layers 24*a* on both sides. Although not particularly limited, the width W1 of the first non-formation region N1 is preferably 1 mm or more, more preferably 2 mm or more, and still more preferably 3 mm or more. The width W1 of the first non-formation region N1 is preferably 20 mm or less, and more preferably 15 mm or less.

As illustrated in FIG. 6, the width from the upper end 24*u* of the negative electrode active material layer 24*a* to an upper end of the first non-formation region N1 of the separator that is, a protrusion allowance of the tab-side end part of the separator 70 that protrudes upward (toward the end side in the winding axis direction WD) relative to the upper end of the negative electrode active material layer 24*a* that faces the separator 70 is a first protrusion allowance part E1. The first protrusion allowance part E1 is a region of the separator 70 that does not face the negative electrode active material layer 24*a*. Here, the width W1 of the first non-formation region N1 and the first protrusion allowance part E1 preferably satisfy 0<E1≤W1. In addition, the first protrusion allowance part E1 is preferably larger than the entire thickness of the negative electrode 24 that faces the first protrusion allowance part E1 and the entire thickness of the positive electrode 22 that faces the first protrusion allowance part E1. Thus, the aforementioned effect of preventing the mixing of a foreign substance can be achieved at the higher level.

In the winding axis direction WD, the second non-formation region N2 is provided at an end part on the side opposite to the first non-formation region N1 as illustrated in FIG. 7. The second non-formation region N2 is provided in a band shape at a lower end part of the separator 70 along the longitudinal direction LD of the separator 70. The second non-formation region N2 is provided in parallel to the adhesive layer 74. In the second non-formation region N2, the adhesive layer 74 is not formed and the heat-resistant layer 73 is exposed. In the battery 100, the second non-formation region N2 is disposed closer to the bottom wall 12*a* than the adhesive layer 74 and the first non-formation region N1 (in other words, on the opposite side of the sealing plate 14). The second non-formation region N2 forms a bottom wall side end part of the separator 70. By the provision of the second non-formation region N2 on the bottom wall side end part, the impregnation with the electrolyte solution can be increased.

As illustrated in FIG. 6, an upper end 74*b* of the second non-formation region N2 (an end part on a central side in the winding axis direction WD, also corresponding to a lower end of the adhesive layer 74 here) exists below a lower end 22*d* of the positive electrode active material layer 22*a* that faces the adhesive layer 74 (on the end side in the winding axis direction WD). The second non-formation region N2 directly faces another (second) separator 70 not through the positive electrode 22, for example.

The lower end 22*d* of the positive electrode active material layer 22*a* is in contact with the adhesive layer 74 here. The second non-formation region N2 does not face the positive electrode active material layer 22*a*. Accordingly, at least one of the effects as described above can be achieved at the high level. For example, attaching the positive electrode 22 and the separator 70 together without allowing the gap therebetween in the winding axis direction WD can prevent a foreign substance from mixing from the lower end 22*d* of the positive electrode active material layer 22*a* more certainly. In addition, the inter-electrode distance between the lower end 22*d* of the positive electrode active material layer 22*a* and the negative electrode active material layer 24*a* increases due to the adhesive layer 74; therefore, the creeping distance when a foreign substance penetrates increases. Accordingly, the risk of the internal short-circuiting can be reduced further. Additionally, the thermal capacity increases due to the adhesive layer 74; thus, when the battery 100 generates heat, the separator 70 does not shrink easily. As a result, the safety can be improved further. However, the second non-formation region N2 may face the positive electrode active material layer 22*a*, which will be described below in a modification.

The upper end 74*b* of the second non-formation region N2 exists above the lower end 24*d* of the negative electrode active material layer 24*a* (on the central side in the winding axis direction WD). The second non-formation region N2 is provided so that the position thereof in the winding axis direction WD overlaps with the negative electrode active material layer 24*a*. Thus, similarly to the case in which the first non-formation region Ni overlaps with the negative electrode active material layer 24*a* as described above, the battery performance such as a high-rate charging and discharging characteristic can be improved. However, the second non-formation region N2 may not face the negative electrode active material layer 24*a*. In other words, the upper end 74*b* of the second non-formation region N2 may exist below (on the end side in the winding axis direction WD) the lower end 24*d* of the negative electrode active material layer 24*a*.

A width W2 of the second non-formation region N2 is preferably larger than the entire thickness of the negative electrode 24 that faces the second non-formation region N2 or the entire thickness of the positive electrode 22 that faces the second non-formation region N2. Thus, the lower end of the negative electrode 24 or the positive electrode 22 can be covered with the separator 70 easily and the aforementioned effect of preventing the mixing of a foreign substance can be achieved at the higher level. Although not particularly limited, the width W2 of the second non-formation region N2 is preferably 1 mm or more, more preferably 2 mm or more, and still more preferably 3 mm or more. The width W2 of the second non-formation region N2 is preferably 20 mm or less, and more preferably 15 mm or less.

The width W2 of the second non-formation region N2 is smaller than the width W1 of the first non-formation region N1 provided in the tab-side end part here. In other words, the width W1 of the first non-formation region N1 in the tab-side end part is larger than the width W2 of the second non-formation region N2 in the bottom wall side end part. In the case where the first non-formation region N1 is disposed closer to the positive electrode tab group 25, the width W1 of the first non-formation region N1 is preferably larger than the width W2 of the second non-formation region N2.

That is to say, when the tubular body is manufactured by winding the band-shaped positive electrode 22 and the band-shaped negative electrode 24 through the band-shaped separator 70, they may be wound based on the bottom wall side end part where the tab is not provided as illustrated in FIG. 5. Specifically, these components may be wound with the positional relation thereof controlled based on a lower end P1 of the positive electrode 22, a lower end P2 of the negative electrode 24, and a lower end P3 of the separator 70. In this case, an end part (tab-side end part) on the opposite side of the bottom wall side end part may have "winding deviation" in which the position of the separator 70 that faces the positive electrode 22 deviates; this deviation occurs more from a winding start end to a winding terminal end. Since the width of the first non-formation region N1 (non-formation region of the tab-side end part), which is disposed on the opposite side of the positions P1 and P3 to be a reference, is made relatively large, the positive electrode active material layer 22*a* does not face the adhesive layer 74 of the separator 70 easily when such a winding deviation occurs, and the adhesive can be efficiently used without a waste.

In the present embodiment, the first non-formation region N1 faces the positive electrode protection layer 22*p* on the positive electrode tab 22*t*. When the battery 100 is manufactured (for example, when the wound electrode body 20 is wound or press-molded), the adhesive layer 74 may be brought into contact with the positive electrode protection layer 22*p*, resulting in that the adhesive is transferred. According to the present inventors' examination, such a transfer occurs easily particularly on a straight line of the positive electrode tab 22*t* in the winding axis direction WD (on a so-called X line (XL in FIG. 2)). Making the width of the first non-formation region N1 (non-formation region of the tab-side end part) relatively large can suppress the transfer of the adhesive particularly on the X line. However, the width W2 of the second non-formation region N2 may be larger than the width W1 of the first non-formation region N1, which will be described in a modification below. The width W2 of the second non-formation region N2 may be substantially the same as the width W1 of the first non-formation region Ni.

As illustrated in FIG. 6, the width from the lower end 24*d* of the negative electrode active material layer 24*a* to the lower end of the second non-formation region N2 of the separator 70, that is, a protrusion allowance of the bottom wall side end part of the separator 70 that protrudes downward (toward the end side in the winding axis direction WD) relative to the lower end of the negative electrode active material layer 24*a* that faces the separator 70 is a second protrusion allowance part E2. The second protrusion allowance part E2 is a region of the separator 70 that does not face the negative electrode active material layer 24*a*. Here, the width W2 of the second non-formation region N2 and the second protrusion allowance part E2 preferably satisfy $0<E2\leq W2$. The second protrusion allowance part E2 is preferably larger than the entire thickness of the negative electrode 24 that faces the second protrusion allowance part E2 and the entire thickness of the positive electrode 22 that faces the second protrusion allowance part E2. Thus, the aforementioned effect of preventing the mixing of a foreign substance can be achieved at the higher level.

The second protrusion allowance part E2 of the bottom wall side end part is smaller than the first protrusion allowance part E1 of the tab-side end part here. In other words, the first protrusion allowance part E1 of the tab-side end part is larger than the second protrusion allowance part E2 of the bottom wall side end part. In particular, in the case where the sealing plate 14 has the liquid injection hole 15, the first protrusion allowance part E1 of the tab-side end part is preferably larger than the second protrusion allowance part E2 of the bottom wall side end part. That is to say, at the liquid injection, injecting the electrolyte solution vigorously may cause the separator 70 to peel off near the liquid injection hole 15, resulting in the contact between the positive electrode 22 and the negative electrode 24. Making the first protrusion allowance part E1 of the tab-side end part relatively large makes it difficult for the separator 70 to peel off at the liquid injection. In addition, at the liquid injection, the electrolyte solution can be injected vigorously, so that the work time can be shortened. The first protrusion allowance part E1, however, may be smaller than the second protrusion allowance part E2, which will be described below in a modification. Alternatively, the first protrusion allowance part E1 and the second protrusion allowance part E2 may have substantially the same length.

As illustrated in FIG. 7, here, the non-formation region is also provided at both end parts of the separator 70 in the longitudinal direction LD. That is to say, a start-end side non-formation region G1 is provided along the winding start end (left end in FIG. 7) and a terminal-end side non-formation region G2 is provided along the winding terminal end (right end in FIG. 7). The start-end side non-formation region G1 and the terminal-end side non-formation region G2 are regions where the adhesive layer 74 is not formed, similarly to the non-formation regions N1 and N2. In the start-end side non-formation region G1 and the terminal-end side non-formation region G2, the heat-resistant layer 73 is exposed. In the longitudinal direction LD, the start-end side non-formation region G1 and the terminal-end side non-formation region G2 may have either the same length or different lengths.

Although not particularly limited, the length of each of the start-end side non-formation region G1 and the terminal-end side non-formation region G2 is preferably 5 mm or more, more preferably 10 mm or more, and still more preferably 20 mm or more. Thus, the aforementioned effect, for example, at least one of the effect of improving the reliability by avoiding the deficiency of the electrolyte solution and the effect of reducing the cost for manufacturing the battery can be achieved at a high level. The length of each of the start-end side non-formation region G1 and the terminal-end side non-formation region G2 in the longitudinal direction LD is preferably 100 mm or less.

Figure 8:
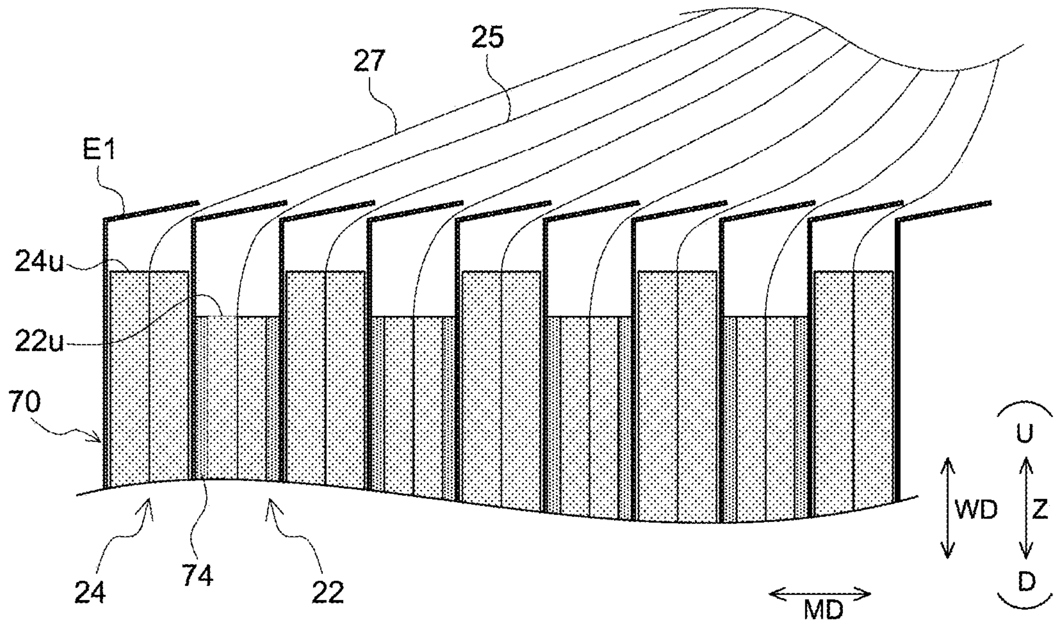
FIG. 8 is a schematic view illustrating an upper end part of the wound electrode body accommodated in a battery case.

FIG. 8 is a schematic view illustrating an upper end part of the wound electrode body accommodated in the battery case 10. Here, the positive electrode 22 and the separator 70 are attached together with the adhesive layer 74 so as to be unified. As illustrated in FIG. 8, the first non-formation region N1 forming the tab-side end part of the separator 70 (more specifically, first protrusion allowance part E1) may be in a bent state within the battery case in a manner that, for example, when the battery 100 is constructed, the positive electrode tab group 25 (or negative electrode tab group 27) is curved or the first non-formation region N1 is brought into contact with the sealing plate 14, the internal insulating member 94 that is interposed between the sealing plate 14 and the wound electrode body 20, or the like.

Here, the first protrusion allowance parts E1 of the separators 70 are bent in one direction along the positive electrode tab group 25 (or negative electrode tab group 27) above the negative electrode active material layer 24*a*, and cover the upper end 22*u* of the positive electrode active material layer 22*a* that faces the separators 70 and the upper end 24*u* of the negative electrode active material layer 24*a* that faces the separators 70. The upper ends of the positive electrode active material layer 22*a* and the negative electrode active material layer 24*a* are preferably covered entirely with the separators 70. Thus, the aforementioned effect of preventing the mixing of a foreign substance can be achieved at the higher level. In addition, here, the first non-formation regions N1 (specifically, first protrusion allowance parts E1) of the adjacent separators 70 overlap with each other. Thus, the cushion property can be increased. For example, at the insertion of the wound electrode body 20 into the battery case 10, even if the wound electrode body 20 interferes with the sealing plate 14 or the internal insulating member 94, the damage of the negative electrode active material layer 24*a* can be suppressed.

According to the present inventors' examination, in the case where the adhesive layer 74 is formed entirely to the first non-formation region N1 of the tab-side end part of the separator 70, the separator 70 may be bent in an undesired shape or be in an undesired form. For example, the first protrusion allowance parts E1 of the adjacent separators 70 may be attached together with the adhesive layer 74, in which case the first protrusion allowance part E1 may be bent in an unintended shape or the adhesive layer 74 may be twisted in the winding axis direction WD. On the other hand, providing the first non-formation region N1 as described in the art disclosed herein makes it easier to bend the first protrusion allowance part E1 along the positive electrode tab group 25 (or negative electrode tab group 27) in a desired shape or form. However, the bent part of the first protrusion allowance part E1 is not required to have no adhesive layer 74 in the entire region and may have the adhesive layer 74 in a part, for example.

Figure 9:
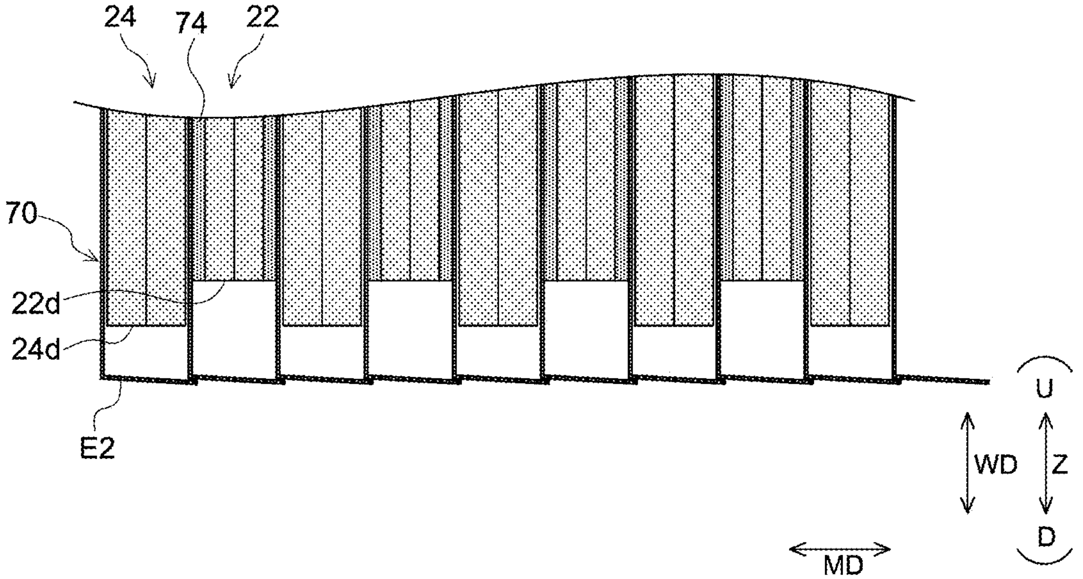
FIG. 9 is a schematic view illustrating a lower end part of the wound electrode body accommodated in the battery case.

FIG. 9 is a schematic view illustrating a lower end part of the wound electrode body 20 accommodated in the battery case 10. Note that the positive electrode 22 and the separator 70 are attached together with the adhesive layer 74 so as to be unified, similarly to FIG. 8. As illustrated in FIG. 9, the second non-formation region N2 forming the bottom wall side end part of the separator 70 (more specifically, the second protrusion allowance part E2) may be in a bent state within the battery case 10 in a manner that, for example, when the battery 100 is constructed, the second non-formation region N2 is pressed against the bottom wall 12*a* of the exterior body 12 through the electrode body holder 29 or the weight of the wound electrode body 20 itself is applied.

Here, the second protrusion allowance parts E2 of the separators 70 are bent in one direction below the negative electrode active material layer 24*a*, and cover the lower end 22*d* of the positive electrode active material layer 22*a* that faces the separator 70 and the lower end 24*d* of the negative electrode active material layer 24*a* that faces the separator 70. By providing the second non-formation region N2, the separator 70 can be easily bent in a desired direction in a manner similar to the case of the upper end, compared to when the adhesive layer 74 is formed entirely to the second non-formation region N2 of the tab-side end part. The lower ends of the positive electrode active material layer 22*a* and the negative electrode active material layer 24*a* are preferably covered with the separators 70 entirely. Thus, the aforementioned effect of preventing the mixing of a foreign substance can be achieved at the higher level, in a manner similar to the case of the upper end. Since the second non-formation regions N2 (specifically, the second protrusion allowance parts E2) of the adjacent separators 70 overlap with each other, the cushion property can be increased. Thus, under the impact at the vibration or drop, for example, the damage of the negative electrode active material layer 24*a* can be suppressed. Note that, in a manner similar to the first protrusion allowance part E1, the bent part of the second protrusion allowance part E2 is not required to have no adhesive layer 74 in the entire region and may have the adhesive layer 74 in a part, for example.

Second Embodiment

Figure 10:
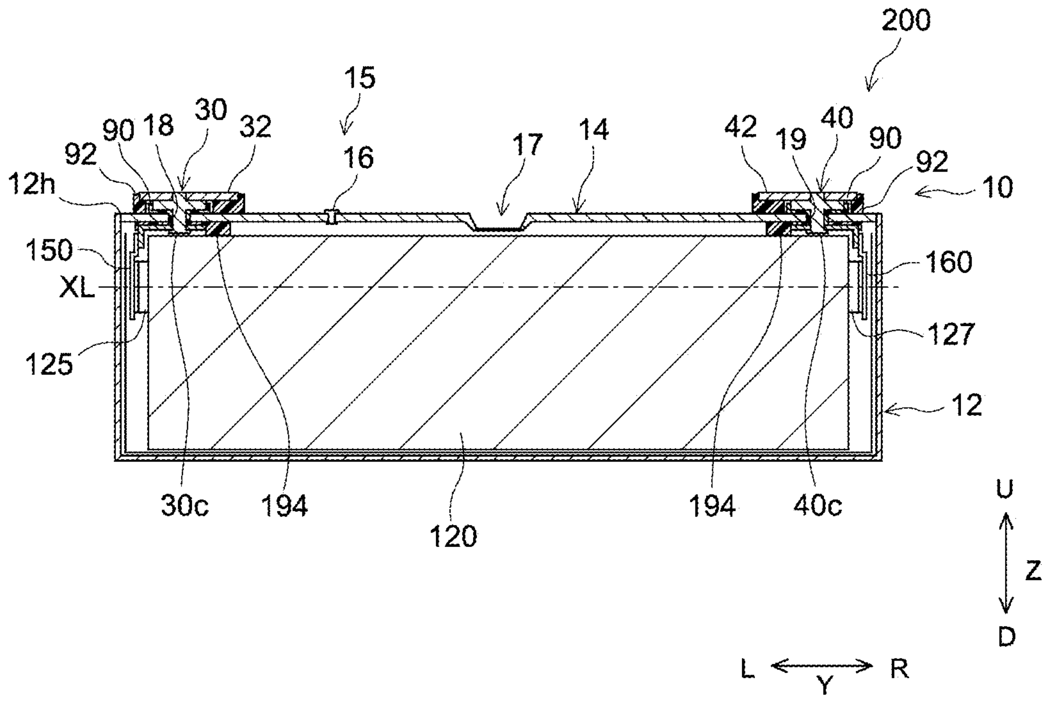
FIG. 10 is a diagram corresponding to FIG. 2 and illustrates a battery according to a second embodiment.

FIG. 10 is a diagram corresponding to FIG. 2 and illustrates a battery 200 according to a second embodiment. As illustrated in FIG. 10, the battery 200 includes a wound electrode body 120 instead of the wound electrode body 20. The battery 200 is different from the battery in the first embodiment in the arrangement of the wound electrode body 120. Therefore, the battery 200 includes a positive electrode tab group 125 and a negative electrode tab group 127 instead of the positive electrode tab group 25 and the negative electrode tab group 27. The battery 200 includes a positive electrode current collecting part 150 and a negative electrode current collecting part 160 instead of the positive electrode current collecting part 50 and the negative electrode current collecting part 60. The battery 200 includes an internal insulating member 194 instead of the internal insulating member 94. Except for these points, the battery 200 may be similar to the battery 100 according to the first embodiment described above.

The wound electrode body 120 is accommodated in the battery case 10 so that the winding axis direction WD substantially coincides with the long side direction Y. In other words, the wound electrode body 120 is disposed in the battery case 10 so that the winding axis direction WD is substantially parallel to the bottom wall 12*a* and the sealing plate 14 and is substantially orthogonal to the long side walls 12*b* and the short side walls 12*c*. The pair of curved parts face the bottom wall 12*a* of the exterior body 12 and the sealing plate 14. The pair of flat parts face the long side walls of the exterior body 12. End surfaces of the wound electrode body 120 (that is, stacked surfaces where the positive electrode 22 and the negative electrode 24 are stacked) face the pair of short side walls 12*c*. Note that the material, structure, and the like of each part of the wound electrode body 120 may be similar to those of the wound electrode body 20 in the first embodiment.

Differently from the first embodiment, the positive electrode tab group 125 is provided at one end part in the long side direction Y (left end part in FIG. 10). The negative electrode tab group 127 is provided at the other end part in the long side direction Y (right end part in FIG. 10). The negative electrode tab group 127 is provided at an end part opposite to the positive electrode tab group 125 in the long side direction Y. The battery 200 has a so-called lateral tab structure in which the positive electrode tab group 125 and the negative electrode tab group 127 exist on the left and right of the wound electrode body 120. In the positive electrode tab group 125, the positive electrode current collecting part 150 is provided. The positive electrode tab group 125 is electrically connected to the positive electrode terminal 30 through the positive electrode current collecting part 150. In the negative electrode tab group 127, the negative electrode current collecting part 160 is provided. The negative electrode tab group 127 is electrically connected to the negative electrode terminal 40 through the negative electrode current collecting part 160.

Figure 11:
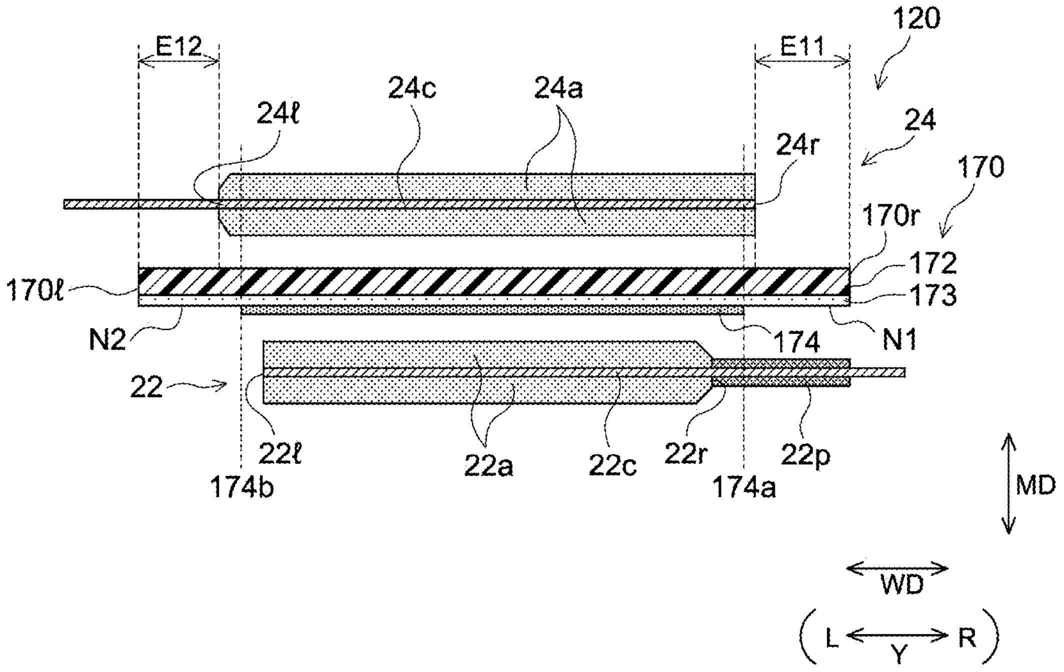
FIG. 11 is a diagram corresponding to FIG. 6 and illustrates a structure of a wound electrode body according to the second embodiment.

FIG. 11 is a diagram corresponding to FIG. 6 and illustrates a structure of the wound electrode body 120. Note that the reference sign WD in FIG. 11 is substantially parallel to the long side direction Y of the battery 200. A separator 170 includes an adhesive layer 174. The structure of the separator 170 may be similar to that of the separator 70 in the first embodiment described above. However, since the wound electrode body 120 is accommodated sideways in this embodiment, the different reference sign is given in order to distinguish from the first embodiment.

The non-formation region exists at each of both end parts of the battery 200 in the long side direction Y here. In other words, the first non-formation region N1 is provided at one end part in the long side direction Y (left end part in FIG. 6 and FIG. 7) and the second non-formation region N2 is provided at the other end part in the long side direction Y (right end part in FIG. 6 and FIG. 7). The first non-formation region N1 is provided closer to the positive electrode tab group 25 than the adhesive layer 74 and the second non-formation region N2. The first non-formation region N1 forms a positive electrode tab-side end part of the separator 70. The second non-formation region N2 is provided closer to the negative electrode tab group 27 than the adhesive layer 74 and the first non-formation region N1. The second non-formation region N2 forms a negative electrode tab-side end part of the separator 70.

The width of the first non-formation region N1 is preferably larger than that of the second non-formation region N2 on the negative electrode tab side. That is to say, when the tubular body is manufactured by winding the band-shaped positive electrode 22 and the band-shaped negative electrode 24 through the band-shaped separator 170, they may be wound with the positional relation controlled based on a left end 221 of the positive electrode 22 and a left end 1701 of the separator 170. In this case, by making the width of the first non-formation region N1, which is apart from the reference of the positive electrode 22 and the separator 170, relatively large, the adhesive can be used efficiently without a waste in a manner similar to the first embodiment. Since the first non-formation region N1 faces the positive electrode protection layer 22*p*, the transfer of the adhesive on a straight line of the positive electrode tab 22*t* in the winding axis direction WD (so-called X line (XL in FIG. 10)) can be suppressed in a manner similar to the first embodiment.

As illustrated in FIG. 11, a left end 174*a* of the first non-formation region N1 (end part on the central side in the winding axis direction WD, also corresponding to a right end of the adhesive layer 174 here) exists on the right side (end side in the winding axis direction WD) of a right end 22*r* of the positive electrode active material layer 22*a* that faces the adhesive layer 174. The first non-formation region N1 does not face the positive electrode active material layer 22*a*. Thus, for example, the aforementioned effect of preventing the mixing of a foreign substance can be achieved at the high level in a manner similar to the first embodiment. The left end 174*a* of the first non-formation region N1 exists on the right side (central side in the winding axis direction WD) of the right end 24*r* of the negative electrode active material layer 24*a*. The first non-formation region N1 is provided so that the position thereof in the winding axis direction WD overlaps with the negative electrode active material layer 24*a*. Thus, similarly to the first embodiment, the battery performance such as a high-rate charging and discharging characteristic can be improved.

A right end 174*b* of the second non-formation region N2 (end part on the central side in the winding axis direction WD, also corresponding to a left end of the adhesive layer 174 here) exists on the left side (end side in the winding axis direction WD) of the left end 221 of the positive electrode active material layer 22*a* that faces the adhesive layer 174. The second non-formation region N2 does not face the positive electrode active material layer 22*a*. Thus, for example, the aforementioned effect of preventing the mixing of a foreign substance can be achieved at the high level in a manner similar to the first embodiment. Furthermore, the risk of the internal short-circuiting can be reduced. The right end 174*b* of the second non-formation region N2 exists on the right side (central side in the winding axis direction WD) of the left end 241 of the negative electrode active material layer 24*a*. The second non-formation region N2 is provided so that the position thereof in the winding axis direction WD overlaps with the negative electrode active material layer 24*a*. Thus, similarly to the first embodiment, the battery performance such as a high-rate charging and discharging characteristic can be improved.

Of the separator 170, a protrusion allowance on a positive electrode tab group side that protrudes to the outside of (in FIG. 11, to the left side of) the end part of the negative electrode active material layer 24*a* on the positive electrode tab group 125 side is a first protrusion allowance part E11 and a protrusion allowance on a negative electrode tab group side that protrudes to the outside of (in FIG. 11, to the right side of) the end part of the negative electrode active material layer 24*a* on the negative electrode tab group 127 side is a second protrusion allowance part E12. The protrusion allowance parts E11 and E12 are regions of the separator 170 that do not face the negative electrode active material layer 24*a*. The first protrusion allowance part E11 is longer than the second protrusion allowance part E12 here. However, in the case where a winding machine has a different specification, for example a reference position at the winding is provided at the right end 22*r* of the positive electrode 22 and a right end 170*r* of the separator 170, the first protrusion allowance part E11 is preferably smaller than the second protrusion allowance part E12. The first protrusion allowance part E11 and the second protrusion allowance part E12 may have substantially the same length.

The internal insulating member 194 includes a protrusion part that protrudes toward the wound electrode body 120 from the inner side surface of the sealing plate 14. Thus, the movement of the wound electrode body 120 in the up-down direction Z is restricted. Thus, the interference of the wound electrode body 120 with the sealing plate 14 under the impact at the vibration or drop, for example, occurs less easily and the damage of the wound electrode body 120 can be suppressed.

<Application of Battery>

The battery 100 is usable in various applications, and for example, can be suitably used as a motive power source for a motor (power source for driving) that is mounted in a vehicle such as a passenger car or a truck. The vehicle is not limited to a particular type, and may be, for example, a plug-in hybrid electric vehicle (PHEV), a hybrid electric vehicle (HEV), or a battery electric vehicle (BEV). The battery 100 can be used suitably for constructing an assembled battery because the variation in battery reaction is reduced.

Although some embodiments of the present disclosure have been described above, these embodiments are just examples. The present disclosure can be implemented in various other modes. The present disclosure can be implemented based on the contents disclosed in this specification and the technical common sense in the relevant field. The techniques described in the scope of claims include those in which the embodiments exemplified above are variously modified and changed. For example, a part of the aforementioned embodiment can be replaced by another modified aspect, and the other modified aspect can be added to the aforementioned embodiment. Additionally, the technical feature may be deleted as appropriate unless such a feature is described as an essential element.

<First Modification>

For example, in FIG. 6 in the first embodiment described above, the width W1 of the first non-formation region N1 is larger than the width W2 of the second non-formation region N2. However, the structure is not limited to this example. The width W1 of the first non-formation region N1 may be smaller than the width W2 of the second non-formation region N2. By reducing the width W1 of the first non-formation region N1, the adhesive layer 74 exists in the first protrusion allowance part E1. In this case, the rigidity of the separator 70 can be increased and the damage of the upper end parts of the positive electrode 22 and the negative electrode 24 is suppressed.

<Second Modification>

For example, in FIG. 6 in the first embodiment described above, the upper end 74*b* of the second non-formation region N2 exists below (on the end side in the winding axis direction WD) the lower end 22*d* of the positive electrode active material layer 22*a* that faces the adhesive layer 74. In addition, in FIG. 11 in the second embodiment described above, the right end 174*b* of the second non-formation region N2 exists on the left side (on the end side in the winding axis direction WD) of the left end 221 of the positive electrode active material layer 22*a* that faces the adhesive layer 174. In any embodiment, the second non-formation region N2 is not in contact with the positive electrode active material layer 22*a*. However, the structure is not limited to this example. In any embodiment, the second non-formation region N2 may face the positive electrode active material layer 22*a*. That is to say, in FIG. 6, the upper end 74*b* of the second non-formation region N2 may exist above the lower end 22*d* of the positive electrode active material layer 22*a*. In FIG. 11, the right end 174*b* of the second non-formation region N2 may exist on the right side of the left end 221 of the positive electrode active material layer 22*a*.

In this case, the electrolyte solution transfers smoothly and for example, the battery performance such as a high-rate charging and discharging characteristic can be improved in a manner similar to the aforementioned case in which the first non-formation region N1 overlaps with the negative electrode active material layer 24*a*. Additionally, in the usual winding, the phase difference between the positive electrode 22 and the negative electrode 24 is examined. At this examination, the arrangement in which the second non-formation region N2 faces the positive electrode active material layer 22*a* (in other words, the adhesive layer 74 is absent between the lower end 22*d* of the positive electrode active material layer 22*a* and the lower end 24*d* of the negative electrode active material layer 24*a* in the winding axis direction WD) makes it easier to check the lower end 24*d* of the negative electrode 24 through the separator 70 from the positive electrode 22 side. Additionally, the impregnation with the electrolyte solution can be enhanced and the occurrence of gas entrainment can be suppressed by improving the degassing property of the wound electrode body 20.

<Third Modification>

For example, in FIG. 6 in the first embodiment described above, the first protrusion allowance part E1 of the tab-side end part is larger than the second protrusion allowance part E2 of the bottom wall side end part. However, the structure is not limited to this example. In the battery 100 with the upper tab structure, the first protrusion allowance part E1 may be shorter than the second protrusion allowance part E2. In other words, the second protrusion allowance part E2 of the bottom wall side end part may be larger than the first protrusion allowance part E1 of the tab-side end part. In this case, the cushion property of the bottom wall side end part can be increased. For example, at the insertion of the wound electrode body 20 into the battery case 10, even if the wound electrode body 20 is seated vigorously on the bottom wall 12*a* (more precisely, the electrode body holder 29), the damage of the negative electrode active material layer 24*a* can be suppressed. Furthermore, the negative electrode active material layer 24*a* will not be damaged easily under the impact at the vibration or drop, for example, during the use of the battery 100, and thus, the vibration resistance can be improved.

<Fourth Modification>

For example, the first protrusion allowance part E1 of the tab-side end part is larger than the second protrusion allowance part E2 of the bottom wall side end part in FIG. 11 in the second embodiment described above. However, the structure is not limited to this example. In a manner similar to the third modification, the first protrusion allowance part E1 may be shorter than the second protrusion allowance part E2 even in the lateral tab structure. For example, in the case where the right end 24*r* of the negative electrode 24 is used as the reference at the winding, the width of the second protrusion allowance part E2 on the opposite side is made relatively large; thus, even when the winding deviation occurs, the relation between the negative electrode active material layer 24*a* and the adhesive layer 74 can be kept suitably.

As described above, the following items are given as specific aspects of the art disclosed herein.

Item 1: The battery including the wound electrode body in which the positive electrode with the band shape including the positive electrode active material layer and the negative electrode with the band shape including the negative electrode active material layer are wound through one or the plurality of separators with the band shape, in which at least one of the separators includes the adhesive layer on at least one surface, and on the one surface, the non-formation region where the adhesive layer is not formed is provided in at least one end part in the winding axis direction.

Item 2: The battery according to Item 1, further including the electrolyte solution.

Item 3: The battery according to Item 1 or 2, in which the separators include the first separator and the second separator, each of the first separator and the second separator includes the adhesive layer on the surface that faces the positive electrode, and the non-formation region is provided on each of the surfaces of the first separator and the second separator that face the positive electrode.

Item 4: The battery according to Item 3, in which each of the first separator and the second separator includes the heat-resistant layer including the inorganic filler and the heat-resistant layer binder on the surface that faces the positive electrode, and the adhesive layer is formed on the heat-resistant layer in each of the first separator and the second separator.

Item 5: The battery according to Item 3 or 4, in which on the surface of each of the first separator and the second separator that faces the negative electrode, when the entire area of the region facing the negative electrode active material layer is 100%, the ratio of the area of the region where the adhesive layer is formed is 10% or less.

Item 6: The battery according to any one of Items 1 to 5, in which the non-formation region includes the first non-formation region provided at one end part in the winding axis direction, and the second non-formation region provided at the other end part in the winding axis direction.

Item 7: The battery according to Item 6, in which the positive electrode includes the positive electrode tab at one end part in the winding axis direction, the first non-formation region is provided at the end part on the side of the positive electrode tab, the second non-formation region is provided at the end part on the opposite side of the positive electrode tab, and in the winding axis direction, the length of the first non-formation region is larger than the length of the second non-formation region.

Item 8: The battery according to Item 6 or 7, in which the non-formation region is provided at least on the surface facing the positive electrode, the positive electrode includes the positive electrode tab at one end part in the winding axis direction, the first non-formation region is provided at the end part on the side of the positive electrode tab, the second non-formation region is provided at the end part on the opposite side of the positive electrode tab, and the entire second non-formation region exists on the end side in the winding axis direction relative to the positive electrode active material layer and the second non-formation region is not in contact with the positive electrode active material layer.

Item 9: The battery according to any one of Items 6 to 8, in which the positive electrode includes the positive electrode tab at one end part in the winding axis direction, the first non-formation region is provided at the end part on the side of the positive electrode tab, the second non-formation region is provided at the end part on the opposite side of the positive electrode tab, and one end of the second non-formation region exists on the central side in the winding axis direction relative to one end of the negative electrode active material layer and the position of the second non-formation region overlaps partially with the position of the negative electrode active material layer in the winding axis direction.

Item 10: The battery according to any one of Items 1 to 9, further including the battery case including: the exterior body including the opening, the bottom wall that faces the opening, and the side wall extending from the edge side of the bottom wall to the opening; and the sealing plate that seals the opening, in which the wound electrode body is disposed in the battery case so that the winding axis direction is substantially orthogonal to the sealing plate and the bottom wall, and the non-formation region of the separator includes the first non-formation region provided at the end part on the side of the sealing plate and the second non-formation region provided at the end part on the side of the bottom wall.

Item 11: The battery according to Item 10, in which the sealing plate includes the liquid injection hole for the electrolyte solution, the separator includes the first protrusion allowance part that protrudes outward in the winding axis direction from the end of the negative electrode active material layer on the side of the sealing plate and the second protrusion allowance part that protrudes outward in the winding axis direction from the end of the negative electrode active material layer on the side of the bottom wall, and the length of the first protrusion allowance part is larger than the length of the second protrusion allowance part in the winding axis direction.

Item 12: The battery according to any one of Items 1 to 9, further including the battery case including: the exterior body including the opening, the bottom wall that faces the opening, and the side wall extending from the edge side of the bottom wall to the opening; and the sealing plate that seals the opening, in which the wound electrode body is disposed in the battery case so that the winding axis direction is substantially orthogonal to the side wall, the positive electrode includes the positive electrode tab in one end part in the winding axis direction, the negative electrode includes the negative electrode tab in the other end part in the winding axis direction, and the non-formation region of the separator includes the first non-formation region provided at the end part on the side of the positive electrode tab and the second non-formation region provided at the end part on the side of the negative electrode tab.

Item 13: The battery according to Item 12, in which the separator includes the first protrusion allowance part that protrudes outward in the winding axis direction from the end of the negative electrode active material layer on the side of the positive electrode tab and the second protrusion allowance part that protrudes outward in the winding axis direction from the end of the negative electrode active material layer on the side of the negative electrode tab, and the length of the first protrusion allowance part is larger than the length of the second protrusion allowance part in the winding axis direction.

REFERENCE SIGNS LIST

10 Battery case
12 Exterior body
14 Sealing plate
20 Wound electrode body
22 Positive electrode
22*a* Positive electrode active material layer
22*c* Positive electrode current collector
24 Negative electrode
24*a* Negative electrode active material layer
24*c* Negative electrode current collector
70, 170 Separator
72 Base material layer
73 Heat-resistant layer
74, 174 Adhesive layer
N1, N2 Non-formation region
100 Battery

What is claimed is:

1. A battery comprising a wound electrode body in which a positive electrode with a band shape including a positive electrode active material layer and a negative electrode with a band shape including a negative electrode active material layer are wound through one or a plurality of separators with a band shape, wherein at least one of the separators includes an adhesive layer on at least one surface, on the one surface, a non-formation region where the adhesive layer is not formed is provided in at least one end part in a winding axis direction, the non-formation region includes a first non-formation region provided at one end part in the winding axis direction, and a second non-formation region provided at the other end part in the winding axis direction, the positive electrode includes a positive electrode tab at one end part in the winding axis direction, the first non-formation region is provided at an end part on a side of the positive electrode tab, the second non-formation region is provided at an end part on an opposite side of the positive electrode tab, and in the winding axis direction, a length of the first non-formation region is larger than a length of the second non-formation region.

2. A battery comprising a wound electrode body in which a positive electrode with a band shape including a positive electrode active material layer and a negative electrode with a band shape including a negative electrode active material layer are wound through one or a plurality of separators with a band shape, wherein at least one of the separators includes an adhesive layer on at least one surface, on the one surface, a non-formation region where the adhesive layer is not formed is provided in at least one end part in a winding axis direction, the non-formation region includes a first non-formation region provided at one end part in the winding axis direction, and a second non-formation region provided at the other end part in the winding axis direction, the non-formation region is provided at least on a surface facing the positive electrode, the positive electrode includes a positive electrode tab at one end part in the winding axis direction, the first non-formation region is provided at an end part on a side of the positive electrode tab, the second non-formation region is provided at an end part on an opposite side of the positive electrode tab, and the entire second non-formation region exists on an end side in the winding axis direction relative to the positive electrode active material layer and the second non-formation region is not in contact with the positive electrode active material layer.

3. A battery comprising a wound electrode body in which a positive electrode with a band shape including a positive electrode active material layer and a negative electrode with a band shape including a negative electrode active material layer are wound through one or a plurality of separators with a band shape, wherein at least one of the separators includes an adhesive layer on at least one surface, on the one surface, a non-formation region where the adhesive layer is not formed is provided in at least one end part in a winding axis direction, the non-formation region includes a first non-formation region provided at one end part in the winding axis direction, and a second non-formation region provided at the other end part in the winding axis direction, the positive electrode includes a positive electrode tab at one end part in the winding axis direction, the first non-formation region is provided at an end part on a side of the positive electrode tab, the second non-formation region is provided at an end part on an opposite side of the positive electrode tab, and one end of the second non-formation region exists on a central side in the winding axis direction relative to one end of the negative electrode active material layer and a position of the second non-formation region overlaps partially with a position of the negative electrode active material layer in the winding axis direction.

4. A battery comprising:

a wound electrode body in which a positive electrode with a band shape including a positive electrode active material layer and a negative electrode with a band shape including a negative electrode active material layer are wound through one or a plurality of separators with a band shape; and a battery case including an exterior body including an opening, a bottom wall that faces the opening, and a side wall extending from an edge side of the bottom wall to the opening, and a sealing plate that seals the opening;

wherein at least one of the separators includes an adhesive layer on at least one surface, on the one surface, a non-formation region where the adhesive layer is not formed is provided in at least one end part in a winding axis direction, the wound electrode body is disposed in the battery case so that the winding axis direction is substantially orthogonal to the sealing plate and the bottom wall, the non-formation region of the separator includes a first non-formation region provided at an end part on a side of the sealing plate and a second non-formation region provided at an end part on a side of the bottom wall, the sealing plate includes a liquid injection hole for an electrolyte solution, the separator includes a first protrusion allowance part that protrudes outward in the winding axis direction from an end of the negative electrode active material layer on the side of the sealing plate and a second protrusion allowance part that protrudes outward in the winding axis direction from an end of the negative electrode active material layer on the side of the bottom wall, and a length of the first protrusion allowance part is larger than a length of the second protrusion allowance part in the winding axis direction.

5. A battery comprising:

a wound electrode body in which a positive electrode with a band shape including a positive electrode active material layer and a negative electrode with a band shape including a negative electrode active material layer are wound through one or a plurality of separators with a band shape; and a battery case including an exterior body including an opening, a bottom wall that faces the opening, and a side wall extending from an edge side of the bottom wall to the opening, and a sealing plate that seals the opening, wherein at least one of the separators includes an adhesive layer on at least one surface, and on the one surface, a non-formation region where the adhesive layer is not formed is provided in at least one end part in a winding axis direction, the wound electrode body is disposed in the battery case so that the winding axis direction is substantially orthogonal to the side wall, the positive electrode includes a positive electrode tab in one end part in the winding axis direction, the negative electrode includes a negative electrode tab in the other end part in the winding axis direction, and the non-formation region of the separator includes a first non-formation region provided at an end part on a side of the positive electrode tab and a second non-formation region provided at an end part on a side of the negative electrode tab.

6. The battery according to claim 5, wherein the separator includes a first protrusion allowance part that protrudes outward in the winding axis direction from an end of the negative electrode active material layer on the side of the positive electrode tab and a second protrusion allowance part that protrudes outward in the winding axis direction from an end of the negative electrode active material layer on the side of the negative electrode tab, and a length of the first protrusion allowance part is larger than a length of the second protrusion allowance part in the winding axis direction.

7. The battery according to claim 1, further comprising an electrolyte solution.

8. The battery according to claim 1, wherein a first separator and a second separator are included as the separator, each of the first separator and the second separator includes the adhesive layer on a surface that faces the positive electrode, and the non-formation region is provided on each of the surfaces of the first separator and the second separator that face the positive electrode.

9. The battery according to claim 8, wherein each of the first separator and the second separator includes a heat-resistant layer including an inorganic filler and a heat-resistant layer binder on the surface that faces the positive electrode, and the adhesive layer is formed on the heat-resistant layer in each of the first separator and the second separator.

10. The battery according to claim 8, wherein on a surface of each of the first separator and the second separator that faces the negative electrode, when an entire area of a region facing the negative electrode active material layer is 100%, a ratio of an area of a region where the adhesive layer is formed is 10% or less.

* * * * *